(12) United States Patent
Knight et al.

(10) Patent No.: US 9,716,518 B2
(45) Date of Patent: Jul. 25, 2017

(54) WIRELESS CONTROLLER SYSTEM

(71) Applicants: Steven J. Knight, Mission Hill, SD (US); Timothy Jack Gilmore, Yankton, SD (US); Wade Anthony Dangler, Yankton, SD (US)

(72) Inventors: Steven J. Knight, Mission Hill, SD (US); Timothy Jack Gilmore, Yankton, SD (US); Wade Anthony Dangler, Yankton, SD (US)

(73) Assignee: Shur-Co, LLC, Yankton, SD (US)

( * ) Notice: Subject to any disclaimer, the term of this patent is extended or adjusted under 35 U.S.C. 154(b) by 0 days.

(21) Appl. No.: 14/803,254

(22) Filed: Jul. 20, 2015

(65) Prior Publication Data

US 2015/0321597 A1 Nov. 12, 2015

Related U.S. Application Data

(60) Division of application No. 13/269,668, filed on Oct. 10, 2011, now Pat. No. 9,088,311, which is a continuation-in-part of application No. 13/032,169, filed on Feb. 22, 2011.

(60) Provisional application No. 61/306,634, filed on Feb. 22, 2010, provisional application No. 61/391,162, filed on Oct. 8, 2010.

(51) Int. Cl.
*H04B 1/034* (2006.01)
*B60P 1/44* (2006.01)

(52) U.S. Cl.
CPC ............ *H04B 1/034* (2013.01); *B60P 1/4471* (2013.01)

(58) Field of Classification Search
CPC . H04B 1/02; H04B 1/03; H04B 1/034; H04B 1/0346; B60P 1/4471; B60P 7/02; B60P 7/04; B60J 11/02; B60J 11/025; B60J 11/06
USPC ........................................................ 701/2, 36
See application file for complete search history.

(56) References Cited

U.S. PATENT DOCUMENTS

| | | |
|---|---|---|
| 6,250,709 B1 | 6/2001 | Haddad |
| 6,614,419 B1 | 9/2003 | May |
| 7,072,745 B2 | 7/2006 | Pillar |
| 7,248,150 B2 | 7/2007 | Mackjust |
| 7,394,367 B1 | 7/2008 | Aupperle |
| 2006/0113783 A1* | 6/2006 | Erickson ................... B60S 9/02 280/766.1 |
| 2006/0155429 A1* | 7/2006 | Boone .................... B60K 35/00 701/1 |

(Continued)

FOREIGN PATENT DOCUMENTS

WO 2010085184 7/2010

OTHER PUBLICATIONS

Control Chief Summit Series Hand Remote, 1 page, download date Jan. 17, 2012 www.controlchief.com/crane-and-industrial/summit-series.aspx.

(Continued)

*Primary Examiner* — Aaron L Troost
(74) *Attorney, Agent, or Firm* — Jeffrey A. Proehl; Woods, Fuller, Shultz & Smith, P.C.

(57) ABSTRACT

A transportation system comprising a vehicle having a first electrically operated component, a second electrically operated component and a wireless controller system. The wireless controller system is used for selectively controlling the operation of the first electrically operated component and the second electrically operated component.

19 Claims, 14 Drawing Sheets

(56) References Cited

U.S. PATENT DOCUMENTS

| | | | |
|---|---|---|---|
| 2006/0173586 A1 | 8/2006 | Swanson | |
| 2008/0057929 A1* | 3/2008 | Min | G08C 17/02 |
| | | | 455/418 |
| 2008/0136660 A1 | 6/2008 | Bailey | |
| 2009/0072576 A1 | 3/2009 | LeBlanc | |
| 2009/0212905 A1* | 8/2009 | Batz | B60G 17/017 |
| | | | 340/5.54 |
| 2009/0248223 A1* | 10/2009 | Ecton | G08C 23/04 |
| | | | 701/2 |
| 2009/0302994 A1 | 12/2009 | Rhee | |
| 2009/0309779 A1* | 12/2009 | Buckbee | E01C 19/20 |
| | | | 341/176 |
| 2010/0070907 A1 | 3/2010 | Harrod | |

OTHER PUBLICATIONS

Control Chief Raymote Infrared Industrial Remote Control, 1 page, download date Jan. 17, 2012 www.controlchief.com/crane-and-industrial/raymore.aspx.

Control Chief Crane Remote Control Transmitters, 1 page, download date Jan. 17, 2012 www.controlchief.com/crane-and-industrial/L-series.aspx.

Roll-Rite Remote Control 6-Button Wireless Keyfob for black box and Remote Control Key-fob Programming, 4 pages, date unknown www.rollrite.com/files/hkk102h6src85c4cs85116m7nr5zj77.pdf.

* cited by examiner

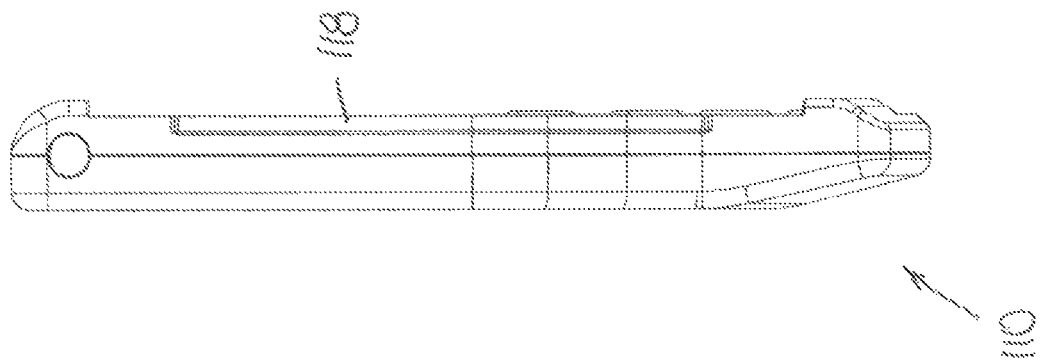
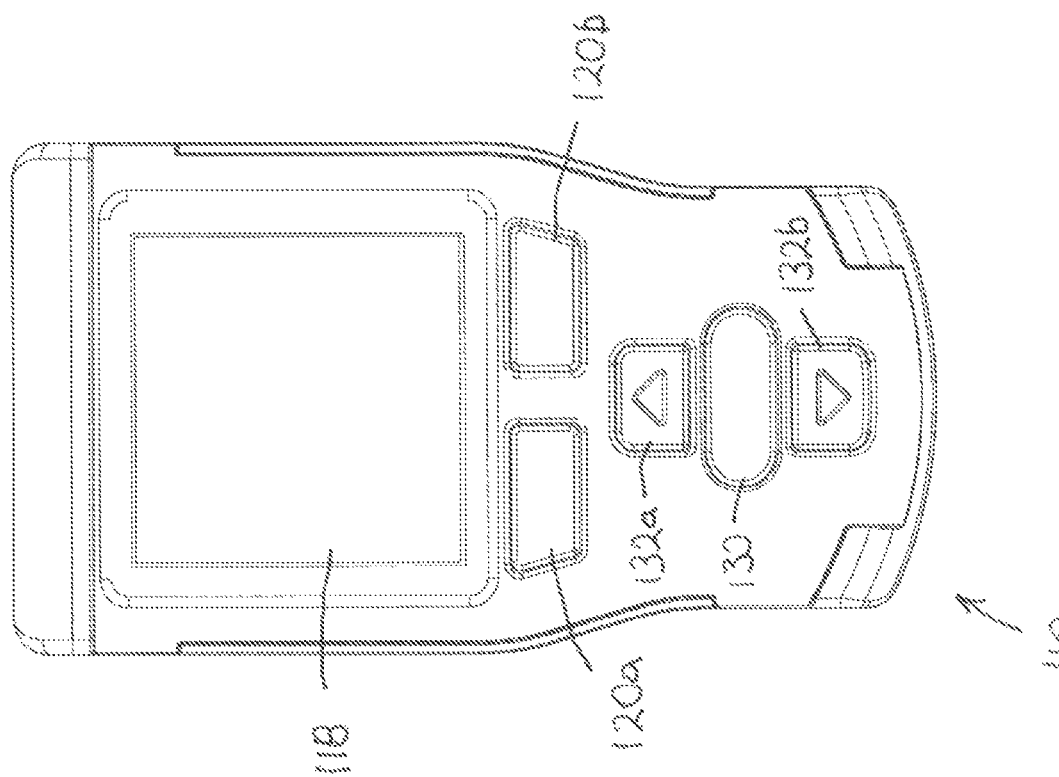

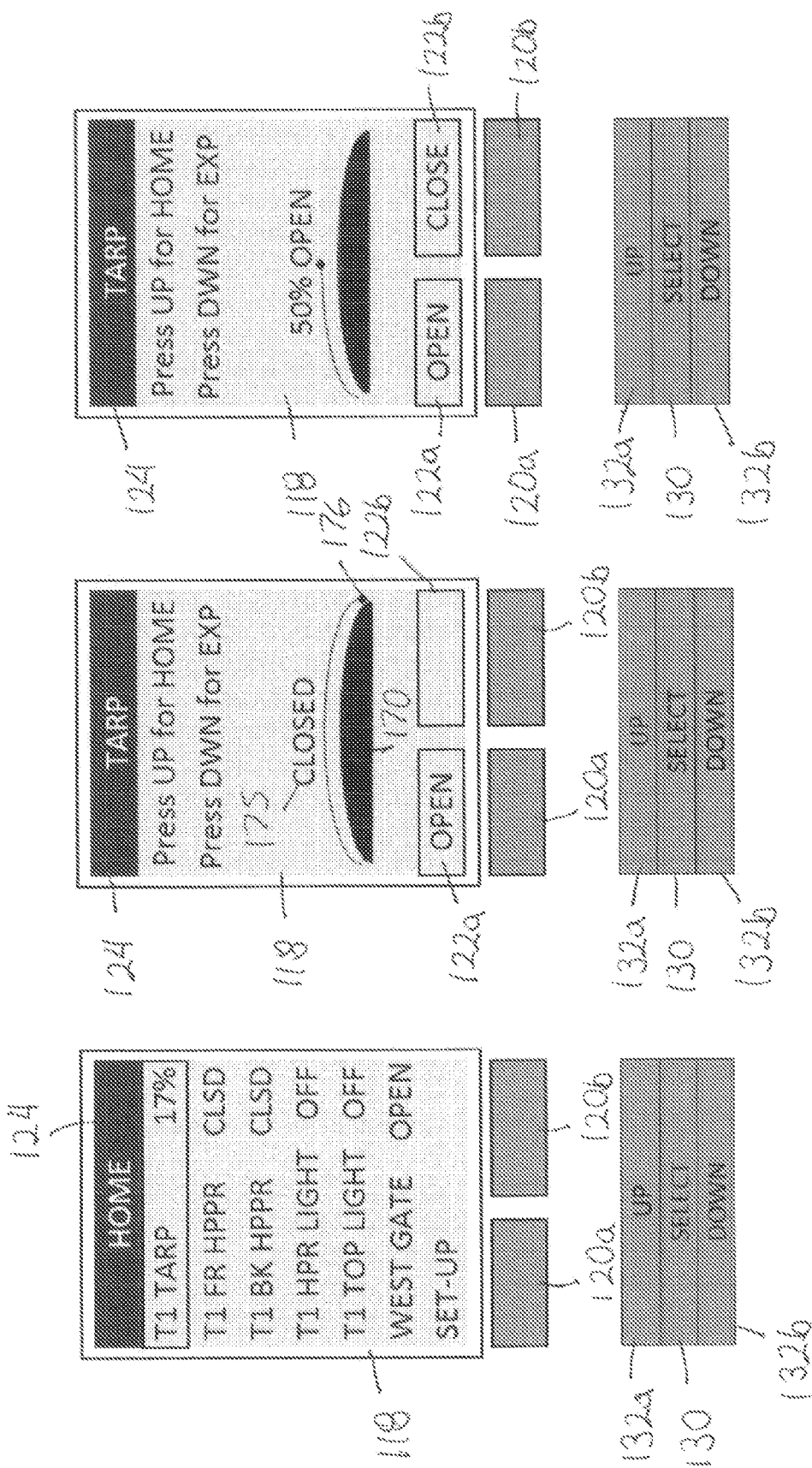

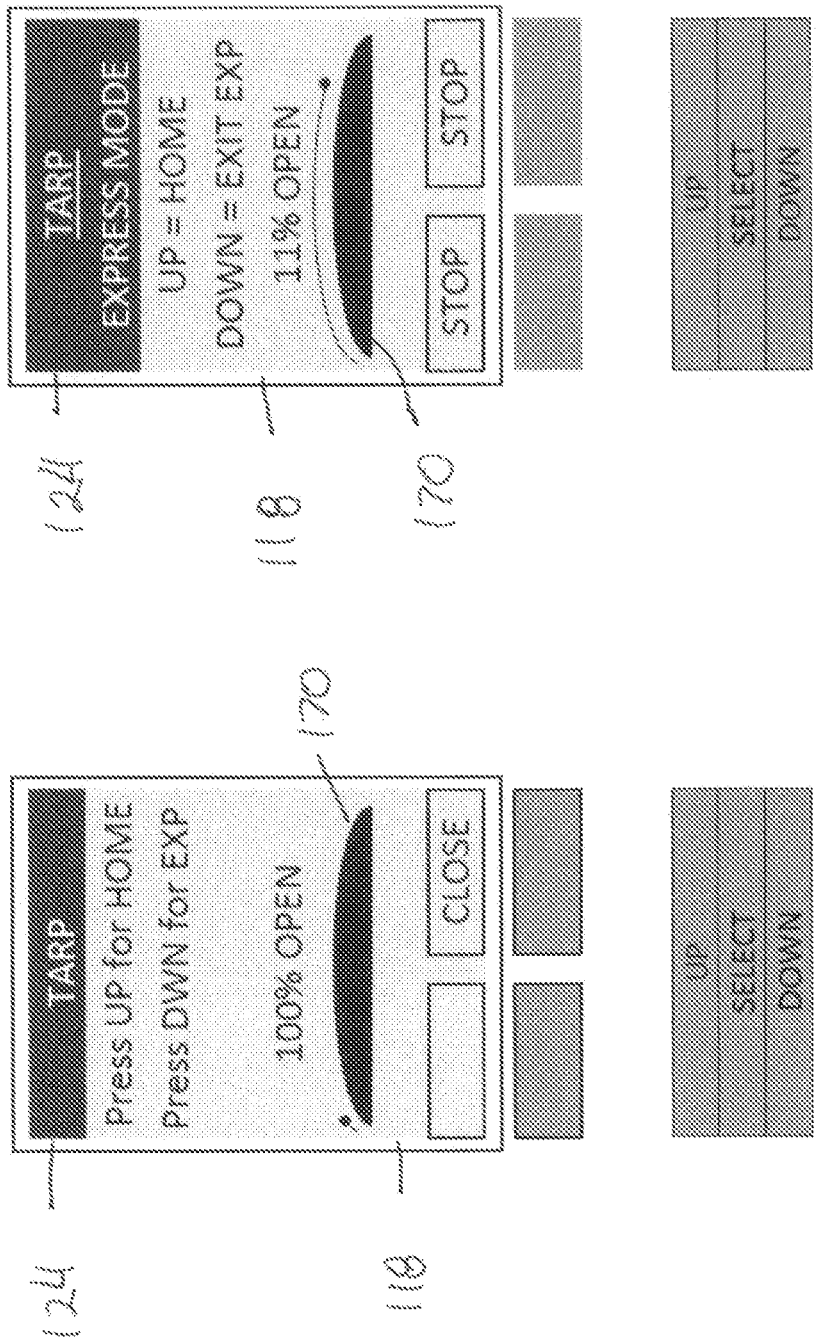

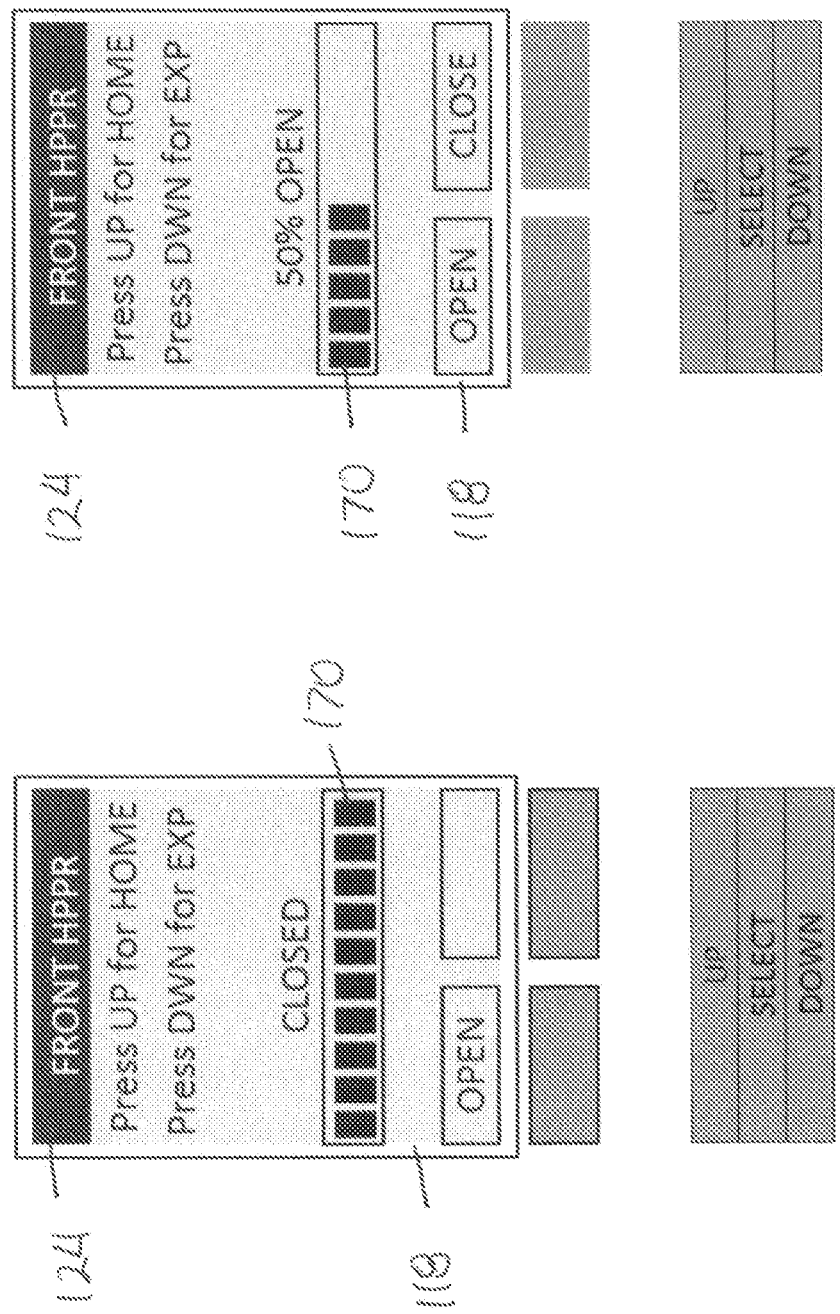

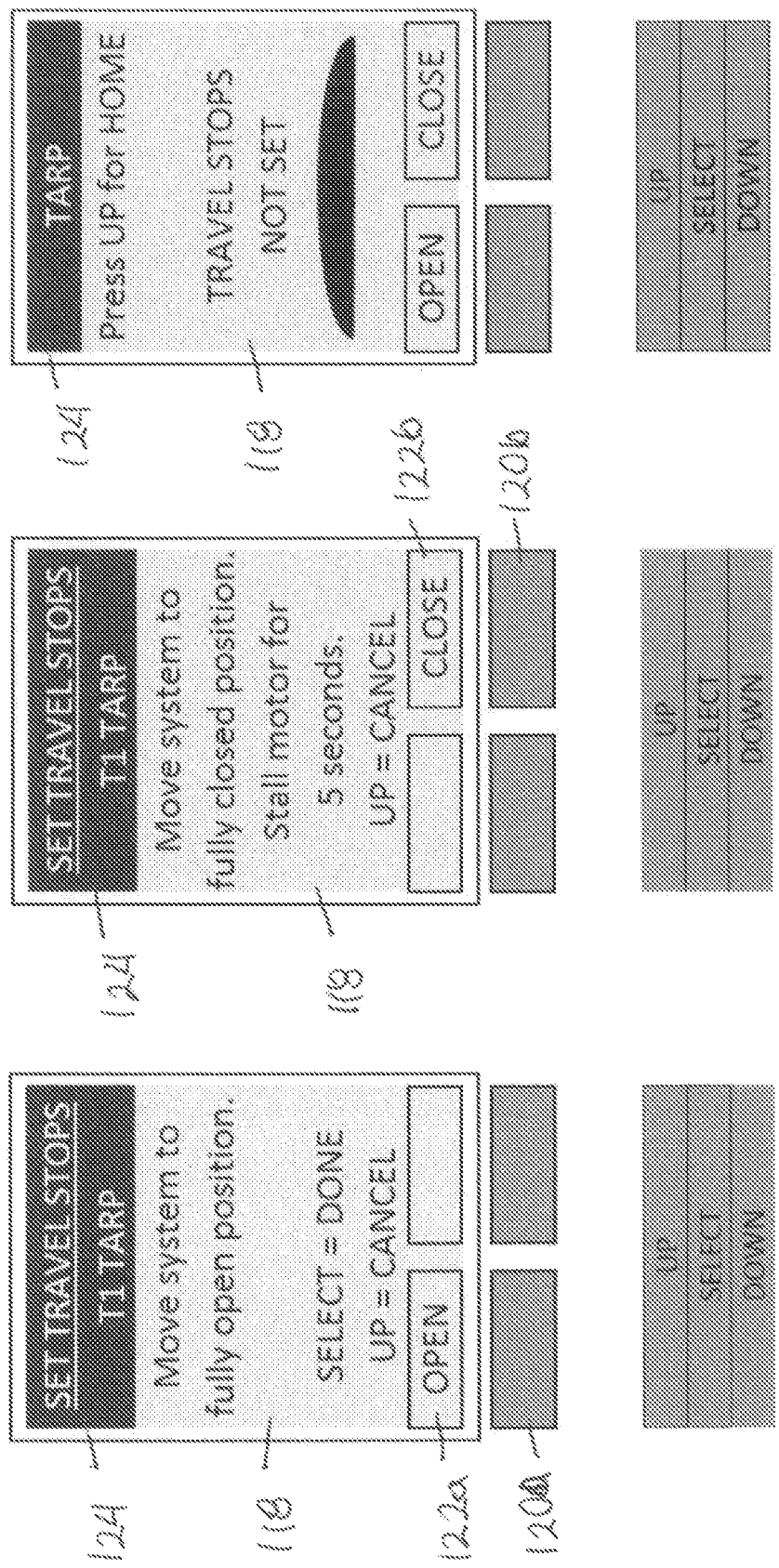

WIRELESS CONTROLLER SYSTEM

REFERENCE TO RELATED APPLICATION

This application is a continuation-in-part of U.S. application Ser. No. 13/032,169, which was filed on Feb. 22, 2011, and which claimed priority to U.S. Applic. No. 61/306,634, which was filed on Feb. 22, 2010, the contents of which are incorporated herein by reference. This application claims priority to U.S. Provisional Application No. 61/391,162, which was filed on Oct. 8, 2010, the contents of which are incorporated herein by reference.

FIELD OF THE INVENTION

The invention relates generally to wireless controllers. More particularly, the invention relates to wireless controller systems for vehicles.

BACKGROUND OF THE INVENTION

Powered accessories have been developed for vehicles. The accessories may increase the functionality of the vehicle and/or reduce the workload of the person operating the vehicle. Examples of such accessories include motorized tarp systems, hoppers, landing gear and lifts on a truck and/or trailer.

As an alternative to operating these accessories with a controller that is directly connected to the accessory or that is connected to the accessory using a wire, wireless transmitters have been developed. One such wireless controller is marketed by Roll Rite, LLC. The Roll Rite wireless controller includes several buttons. Pressing one of the buttons causes the associated accessory on the vehicle to be activated or deactivated.

SUMMARY OF THE INVENTION

An embodiment of the invention is directed to a transportation system that includes a vehicle having a first electrically operated component, a second electrically operated component and a wireless controller system. The first electrically operated component and the second electrically operated component are used in conjunction with the vehicle.

The wireless controller system includes a communication mechanism, a display mechanism, at least one component selection mechanism, at least one component operation mechanism and at least one component operation identifier. The communication mechanism is operably connected to the first electrically operated component and the second electrically operated component.

The display mechanism includes a first identifier and a second identifier. The first identifier identifies the first electrically operated component. The first identifier includes an indicator of an operational status of the first electrically operated component. The second identifier identifies the second electrically operated component. The second identifier includes an indicator of an operational status of the second electrically operated component.

The at least one component selection mechanism is capable of selecting at least one of the first electrically operated component and the second electrically operated component. The at least one component operation mechanism is capable of controlling the operation of the selected at least one of the first electrically operated component and the second electrically operated component.

The at least one component operation identifier is associated with the at least one component operation mechanism. The at least one component operation identifier is changeable based upon at least one of the selected at least one of the first electrically operated component and the second electrically operated component.

Another embodiment of the invention is directed to a transportation system that includes a vehicle having at least two electrically operable accessories associated therewith and a wireless controller system.

The wireless controller system includes a base portion, a communication mechanism, a component selection mechanism, a component operation mechanism and a display mechanism. The communication mechanism is mounted with respect to the base portion.

The component selection mechanism is mounted with respect to the base portion. The component selection mechanism enables at least one of the at least two electrically operable accessories to be selected.

The component operation mechanism is mounted with respect to the base portion. The component activation mechanism causes the transmission mechanism to transmit a communication signal to the selected at least one of the at least two electrically operable accessories.

The display mechanism is mounted with respect to the base portion. The display portion identifies at least two electrically operable accessories that are associated with the wireless controller system and indicates an operational status of the at least two electrically operably accessories.

Another embodiment of the invention is directed to a wireless controller system for use in controlling at least two electrically operable accessories that are associated with a vehicle. The wireless controller system includes a communication mechanism, a display mechanism, at least one component selection mechanism, at least one component operation mechanism and at least one component operation identifier.

The communication mechanism is operably connected to an electrically operated component that is controllable with the wireless controller system. The display mechanism includes an identifier that identifies the electrically operated component. The identifier includes an indicator of an operational status of first electrically operated component.

The at least one component selection mechanism is capable of selecting an electrically operated component. The at least one component operation mechanism is capable of controlling the operation of the electrically operated component. The at least one component operation identifier is associated with the at least one component operation mechanism. The at least one component operation identifier is changeable based upon the electrically operated component.

Still another embodiment of the invention is directed to a method of using a wireless controller system for operably controlling at least two electrically operable accessories that are associated with a vehicle. The method includes providing a wireless controller system having a display mechanism, a component selection mechanism, a component operation mechanism, a component operation identifier and a communication mechanism.

A list of the at least two electrically operable accessories and an operational status of the at least two electrically operable accessories is displayed on the display mechanism. One of the at least two electrically operable accessories is selected using the component selection mechanism An available operational function associated with the component operation mechanism is displayed on the component operation identifier. The component operation identifier is determined by the selected electrically operable accessory.

Pressing the component operation mechanism initiates the available operational function. A first communication signal is sent to the selected electrically operable accessory using the communication mechanism.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 7 is a front view of a wireless controller system according to another embodiment of the invention. (pivoting cover not shown) Not needed because text references absence of cover.

FIG. 8 is a side view of the wireless controller system of FIG. 7.

FIG. 9 is a front view of a display mechanism for the wireless controller system of FIG. 7 where the display mechanism is in an initial mode.

FIG. 10 is the display mechanism in a tarp control mode where a tarp is in a closed position.

FIG. 11 is the display mechanism in the tarp control mode where the tarp is in a 50% open position.

FIG. 12 is a display mechanism in the tarp control mode where the tarp is in a 100% open position.

FIG. 13 is the display mechanism in a tarp express control mode where the tarp is in an 11% open position.

FIG. 14 is the display mechanism in a front hopper control mode where a front hopper is in a closed position.

FIG. 15 is the display mechanism in front hopper control mode where the front hopper is in a 50% open position.

FIG. 24 is the display mechanism in a set travel stops control mode to confirm a fully open position.

FIG. 25 is the display mechanism in the set travel stops control mode to confirm a fully closed position.

FIG. 26 is the display mechanism in the tarp control mode with a warning that tarp travel stop have not been set.

DETAILED DESCRIPTION OF THE PREFERRED EMBODIMENTS

An embodiment of the invention is directed to a wireless controller system, as illustrated at 10 in the Figures. One application that the wireless controller system 10 is particularly suited is for use in controlling the operation of accessories on trucks, trailers, grain carts and/or wagons. Examples of such accessories include tarp systems, hoppers, landing gear, lifts and lights.

Figure 3:
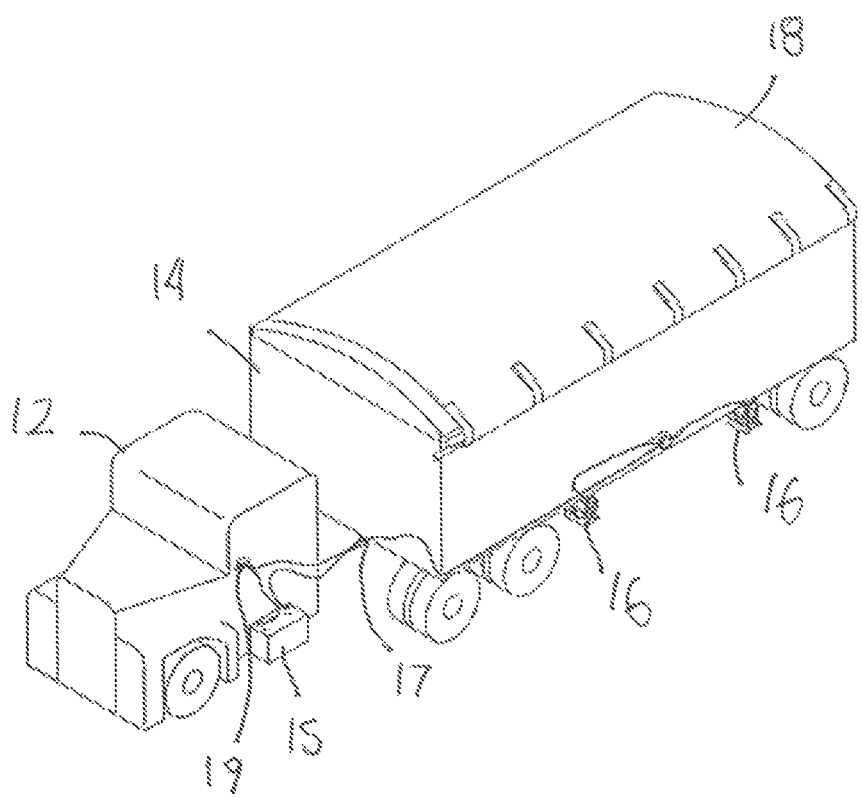
FIG. 3 is a perspective view of a cab and trailer on which the wireless controller system may be used.

In one configuration, the wireless controller system 10 may be used in conjunction with a truck having a cab 12 and a trailer 14, as illustrated in FIG. 3. The trailer 14 may include at least one hopper door assembly 16 on a lower surface thereof that is capable of being operated with a powered hopper mechanism.

The trailer 14 may also include a rolling tarp system 18 that is capable of being positioned in an unrolled configuration (illustrated in FIG. 3) where the tarp system substantially covers an upper surface of the trailer 14 to thereby enclose the interior of the trailer 14.

The tarp system 18 may also be rolled to a rolled up configuration (not shown) where a substantial portion of the upper surface of the trailer 14 is not covered. The movement of the tarp system 18 between the unrolled configuration and the rolled configuration may be accomplished using a powered tarp mechanism such as is sold by the assignee of the present application under the designation 3500 series electric.

The components of the powered hopper mechanism and the powered tarp mechanism may be controlled by attachment to a power source. An example of one such power source is a battery 15 that is provided on the cab 12. Alternatively, a separate power source may be provided to power the operation of the powered hopper mechanism 16 and the powered tarp mechanism 18. This separate power source may be mounted on trailer or may be mounted on the ground proximate to where it is desired to use the powered hopper mechanism 16 and the powered tarp mechanism 18.

To facilitate detachment of the cab 12 from the trailer 14, a coupler 17 may be provided between the battery 15 and the powered hopper mechanism and the powered tarp mechanism. A master disconnect switch 19 may also be provided to turn on and off the complete system encompassed by the powered hopper mechanism and the powered tarp mechanism.

The wireless controller system 10 may also be used with stationary objects that are used in conjunction with a truck, trailers, grain cart and/or wagon. Examples of such objects include electric gates, grain bin hatches, augers, building curtain systems and fabric doors.

Figure 1:
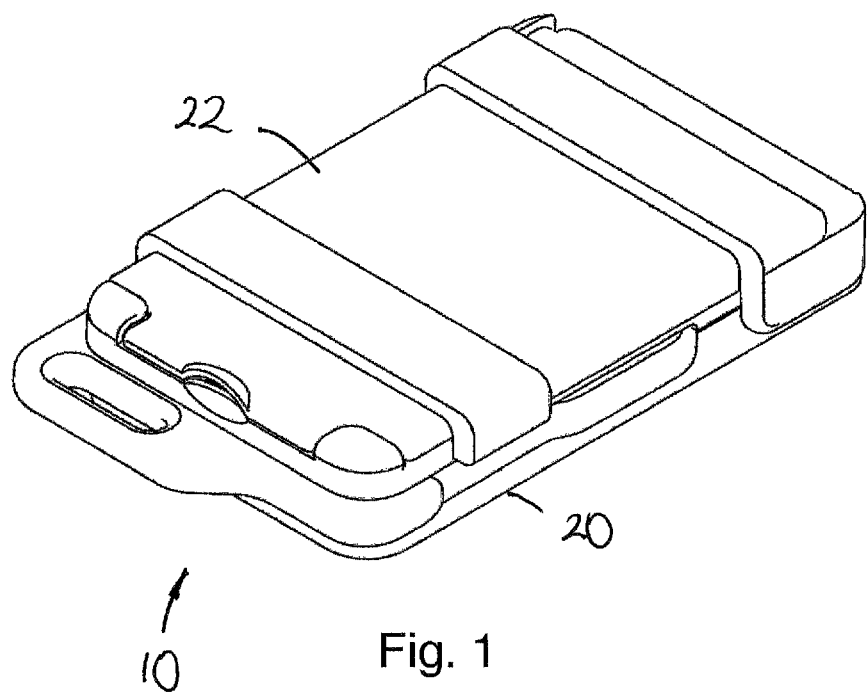
FIG. 1 is a perspective view of a wireless controller system according to an embodiment of the invention where the wireless controller system is in a closed configuration.
Figure 2:
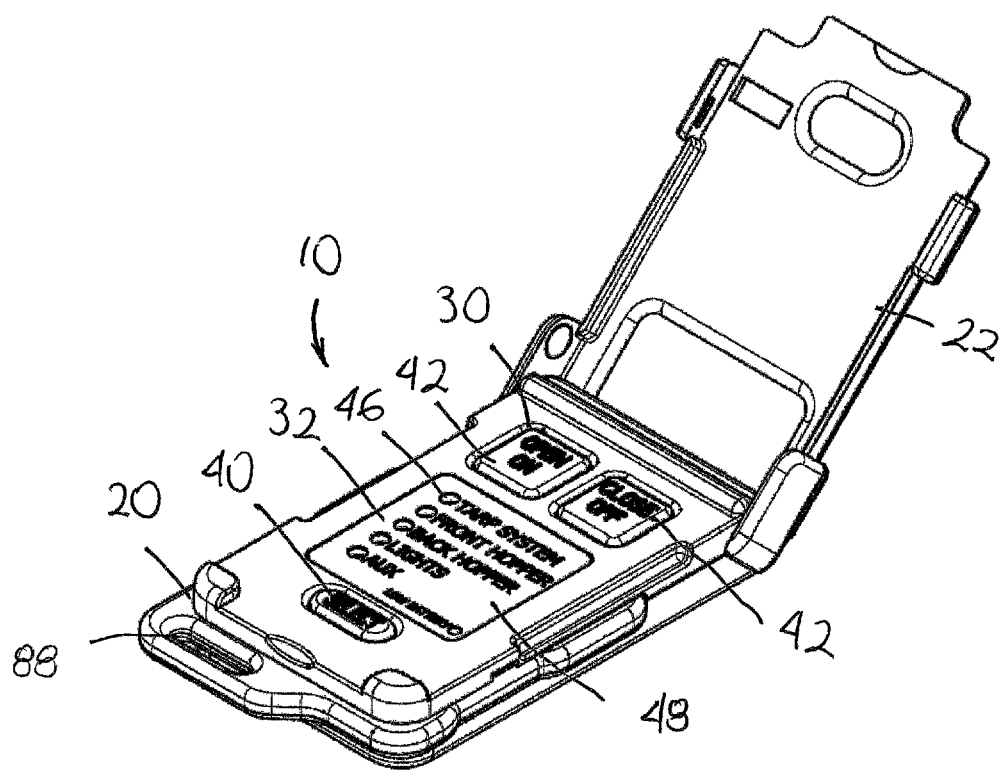
FIG. 2 is a perspective view of the wireless controller system in an open configuration.

The wireless controller system 10 may include a base portion 20 in which at least a portion of the components of the wireless controller system 10 are provided. The wireless controller system 10 may also include a cover portion 22 that is mounted with respect to the base portion 20. The base portion 20 and the cover portion 22 are movable between a closed configuration (FIG. 1) and an open configuration (FIG. 2).

In certain embodiments, the cover portion 22 may be pivotally or slidably mounted to the base portion 20. To minimize the potential of the base portion 20 or the cover portion 22 being lost, the base portion 20 should resist detachment from the cover portion 22.

When in the closed configuration, the cover portion 22 protects the components of the wireless controller system 10 from damage. Positioning the cover portion 22 in the closed configuration also reduces the potential of inadvertent activation of the wireless controller system 10.

Figure 4:
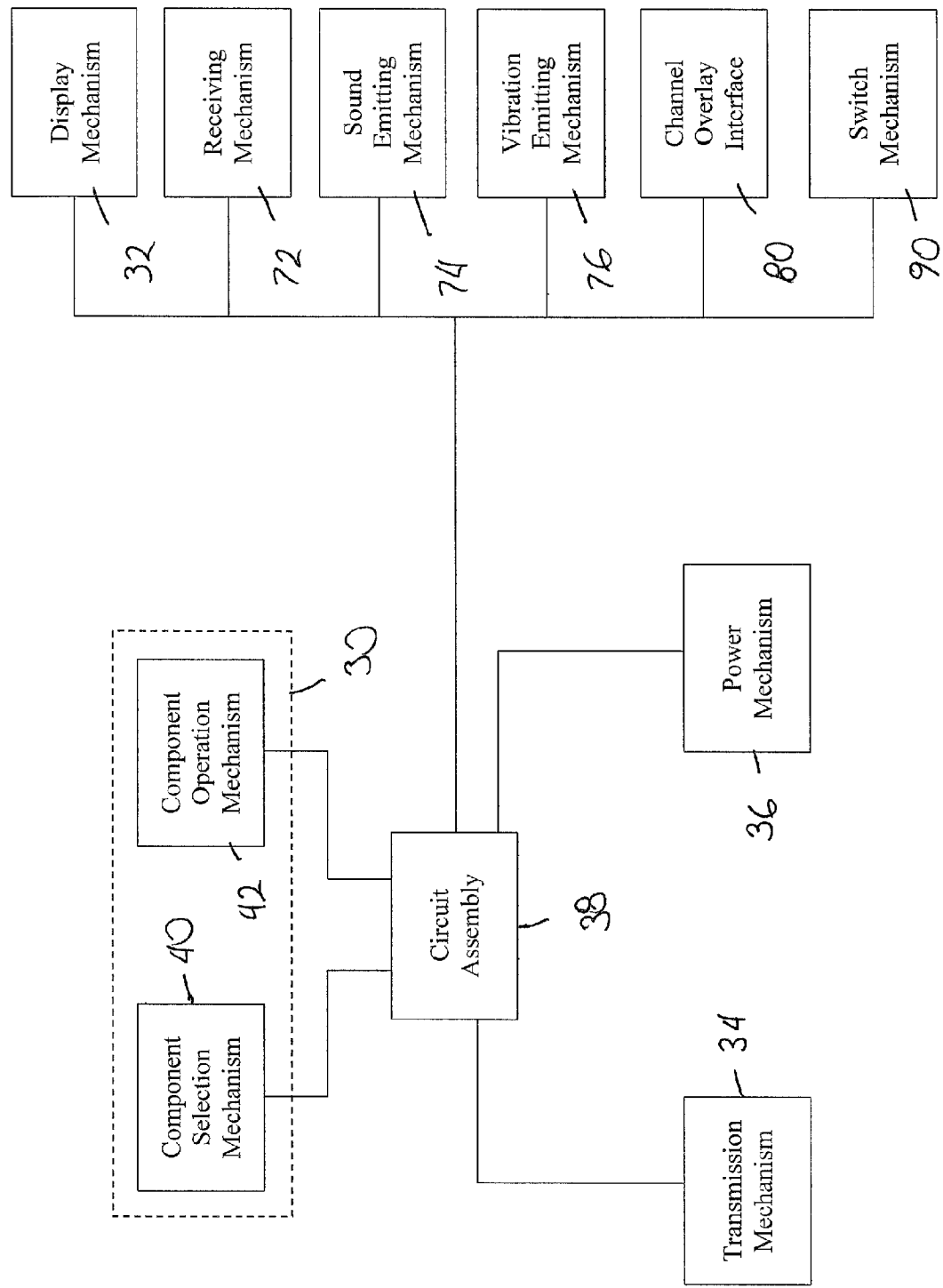
FIG. 4 is a system diagram illustrating interconnection of components within the wireless controller system.

The wireless controller system 10 may include an activation mechanism 30, a display mechanism 32, a transmission mechanism 34, a power mechanism 36 and a circuit assembly 38, such as is illustrated in FIG. 4.

The activation mechanism 30 may include at least one component selection button 40 and at least one component operation button 42. The at least one component selection button 40 enables the wireless controller system 10 to be used in conjunction with controlling the operation of multiple components without the need to have a separate device operation button for each of the components. This configuration also enables the wireless controller system 10 to be reconfigured to control different and/or additional devices.

To enhance the ability of an operator to learn how to correctly use the wireless controller system 10, the at least one component operation button 42 may be positioned away from other buttons on the wireless controller system 10. Such a configuration thereby reduces the potential of the component being inadvertently operated. For example, buttons located proximate an upper end of the wireless controller system 10 may be designated as component operation buttons 42. Buttons located proximate a lower end of the wireless controller system 10 may be designated as component selection buttons 40.

While inadvertently operating a device such as a light may have minimal negative consequences, inadvertently operating a device such as a hopper door or cover system may have significant negative consequences. For example, inadvertent opening of the hopper door could cause the product stored in the vehicle to be discharged from the vehicle. If the vehicle was moving while the product began discharging from the hopper, the discharging product could cause damage to vehicle as well as other vehicles located in proximity thereto.

In certain embodiments, such as illustrated in FIG. 2, the at least one component selection button comprises a select button. Depressing the component select button changes the component that is being controlled by the wireless controller system 10, such as by skipping to the next component that is available to be operated. The component select button 40 may also be used to enter a programming mode as is discussed below in more detail.

In certain embodiments, the component operation button 42 may include two operation buttons 40, 42. The first operation button 60 may be used to open or turn on the accessory. The second operation button 62 may be used to close or turn off the accessory.

The display mechanism 32 may take a variety of configurations using the concepts of the invention. In certain embodiments, the display mechanism 32 may include at least one light emitting diode 46 such as illustrated in FIG. 2. The at least one light emitting diode 46 may be placed adjacent to the text and/or a graphic 48 so that a person operating the wireless controller system 10 will appreciate the significance of the light emitting diode being illuminated.

For example, the text "TARP SYSTEM" may be oriented adjacent to one of the light emitting diodes 46. Alternatively or additionally, a graphic representation of a trailer may be provided and the light emitting diode 46 may be placed adjacent to a region of the trailer where the tarp system would be located.

In other embodiments, the display mechanism 32 may include a graphic display that, for example, includes a listing of the accessories that may be controlled by the wireless controller system 10 and an indicator to indicate the status of the accessories.

The transmission mechanism 34 may function as an exemplary communication mechanism which enables the wireless controller system 10 to communicate with the component being controlled. As such, the transmission mechanism 34 should be capable of communicating in the same protocol as the component being controlled. An example of one such suitable communication protocol is radio frequency. In certain embodiments, the transmission mechanism 34 is capable of transmitting in multiple protocols. It is possible for the communication between the wireless controller system and the accessory being controlled to be encrypted or encoded to prevent unauthorized operation of the accessory being controlled.

In certain embodiments, the wireless controller system 10 may include a receiving mechanism 72 that is capable of receiving wireless communication signals from the component being controlled. For example, the receiving mechanism 72 may receive a confirmation that the component being controlled received the signal from the transmission mechanism 34.

This configuration would provide a two-way communication link between the wireless controller system 10 and the component being controlled. Benefits of providing the two-way communication link include being able to confirm that the component being controlled accurately received the command from the wireless controller system 10.

The two-way communication link could also be used to verify the signal quality between the wireless controller system 10 and the component being controlled. If the signal quality dropped below a threshold level, a warning could be displayed on the wireless controller system 10 indicating that there is a danger of the communication link being broken. As an alternative or in addition to providing a visible or audible warning when the signal quality drops below a threshold level, the wireless controller system 10 may include a graphic display of the signal quality.

Another potential benefit of the two-way communication link is that the system could account for radio frequency noise that is generated proximate to the wireless controller system 10 and/or the component being controlled. One potential source of the radio frequency noise is the motors and associated components that are used to operate the components on the trailer on which the wireless controller system 10 is used.

The two-way communication link could also minimize the potential of interference negative effects caused by more than one wireless controller system 10 being used adjacent to more than one component being controlled that are located on different vehicles.

Yet another benefit of using the two-way communication link is that the component being controlled may transmit error codes when the component being controlled does not operate correctly. For example, if a controller associated with a motor senses that the motor has failed, the controller can transmit to the wireless controller system 10 a unique error code, which identifies the particular component that has failed.

Such a process allows the person using the wireless controller system 10 to not only know when the component is not operating correctly, but also facilitates servicing the broken component so that the component may be fixed more quickly.

The two-way communication link could also be used for the component being controlled to report back to the wireless controller system 10 the actual location of the component. For example, the component being controlled may transmit back to the wireless controller system 10 when the component has reached the open position. Alternatively or additionally, a graphical representation may be provided to track how far the accessory has moved between the open configuration and the closed configuration.

As an alternative to directly communicating with each of the components that are being controlled by the wireless controller system 10, it is possible for all of the controllable components on a particular vehicle to be linked together. Such a system would obviate the need to include a separate transmitter for each of the components, which thereby reduces the cost of the system.

The combined system could also be used to monitor other aspects of the vehicle that are not controlled by the wireless controller system 10, but which are important to the correct operation of the vehicle or the correct operation of the wireless controller system 10. Examples of such other aspects include the power being provided to the vehicle on which the component being operated is within a specified range or it being sensed that one of the power lines is defective such as being cut.

If there is a failure of such an aspect, a warning message could be transmitted to the wireless controller system 10. In this way, the components affected by the failure could be disabled until the failure is corrected.

The system could include logic mechanisms that cause multiple activities to occur at the same time, when a single activation button is pressed. For example, a safety brake on the vehicle may be engaged prior to the opening of a hopper door to prevent the vehicle from being moved while the hopper door is opened.

The power mechanism 36 provides power to operate the accessories in the wireless controller system 10, so that the wireless controller system 10 may be operable without connection to an external power source. The power mechanism 36 may include at least one battery.

The battery may be permanently or removably mounted in the wireless controller system 10. The permanently mounted battery may be rechargeable when depleted while the removably mounted battery may be replaceable when depleted. Alternatively or additionally, the power mechanism 36 may include a solar panel, an electrical cord that plugs into a conventional electrical outlet or cigarette lighter or combination thereof.

In certain embodiments, the wireless controller system 10 may have the ability to be operated for a period of time of at least 3 days between when the battery becomes sufficiently drained so that recharging the battery is warranted.

The wireless controller system 10 may include provisions for recharging the battery 36 without removing the battery from the wireless controller system 10. In certain embodiments, the battery 36 may be recharged by connecting the wireless controller system 10 to an external power source (not shown). Examples of other techniques that may be used to recharge the battery 36 include a solar panel mounted on a surface of the wireless controller system 10 or a docking station that automatically connects power when the wireless controller system 10 is inserted.

The circuit assembly 38 is mounted within the base portion 20 and provides for operable interconnection of the components in the wireless controller system 10. A person of skill in the art will appreciate that the circuit assembly 38 may take a variety of configurations using the concepts of the invention.

In certain embodiments, the wireless controller system 10 may include a sound emitting mechanism 74. For example, the sound emitting mechanism may emit a sound when one of the channels on the wireless controller system 10 is transmitting or when a communication error has occurred.

In other embodiments, the wireless controller system 10 may include a vibrating mechanism 76. For example, the vibrating mechanism may emit vibrations when one of the channels on the wireless controller system 10 is transmitting or when the device being controlled has reached its full travel position.

Figures 5, 6:
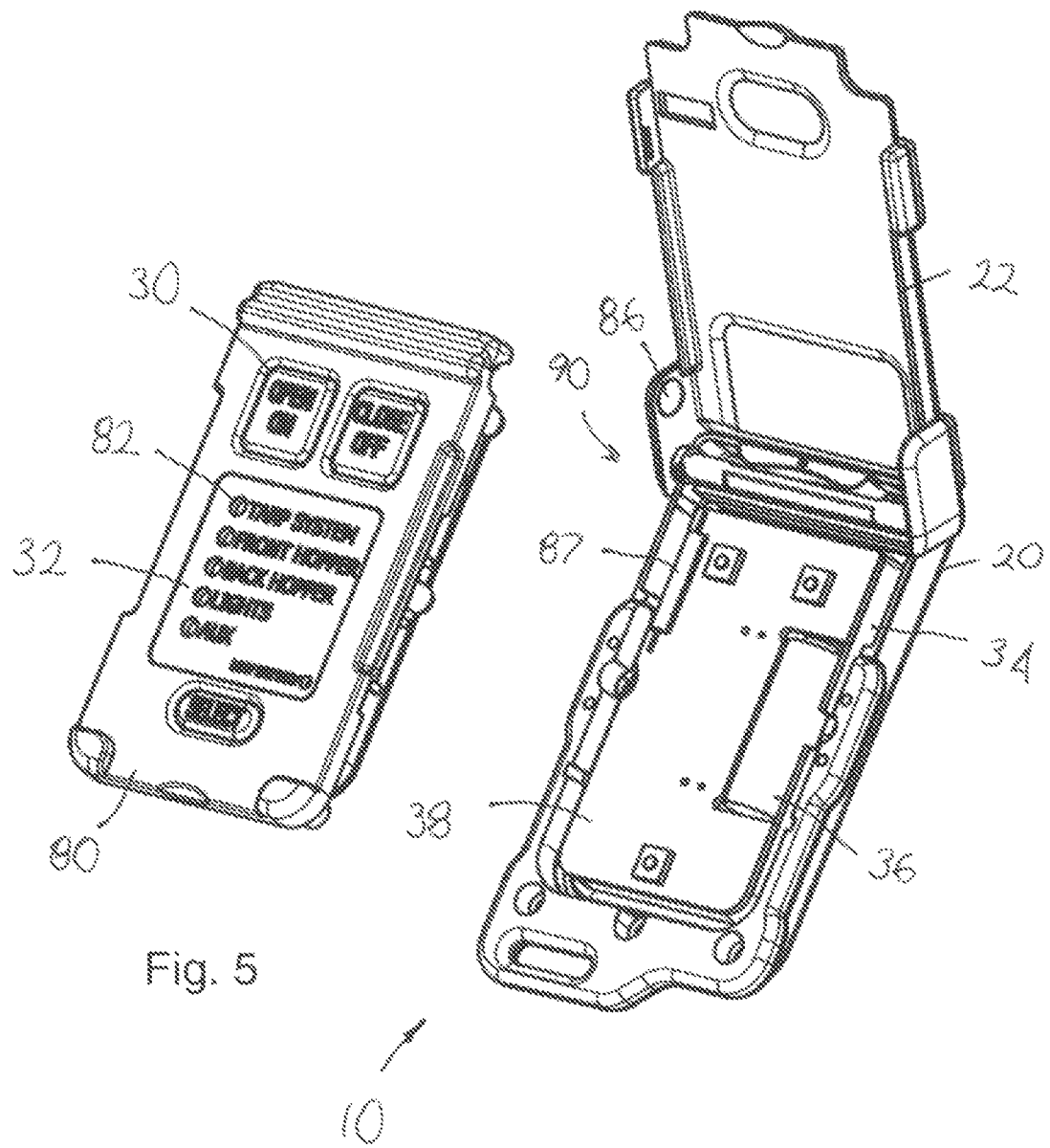
FIG. 5 is a perspective view of a channel identifier overlay for use with the wireless controller system.
FIG. 6 is a perspective view of the wireless controller system with the channel identifier overlay detached therefrom.

At least one of the components in the wireless controller system 10 may be incorporated into a channel identifier overlay 80. The channel identifier overlay 80 (FIG. 5) may be removably attached to the base portion 20 (FIG. 6). Removably attaching the channel identifier overlay 80 enables the wireless controller system 10 to be configured for use with particular systems that have different components that are to be controlled by the wireless controller system 10. As an alternative to replacing the entire channel identifier overlay 80, it is possible to replace a decal that is on a surface of the channel identifier overlay 80.

The channel identifier overlay 80 may also cover the components that are in the base portion 20. For example, removing the channel identifier overlay 80 may enable the battery to be replaced. A variety of techniques may be used to attach the channel identifier overlay 80 to the base portion 20. An example of one such suitable technique is a plurality of screws.

To reduce the time associated with programming the wireless controller system 10, the wireless controller system 10 may be marketed with multiple channel identifier overlays 80 that include different accessory configurations. Each of the channel identifier overlays 80 may include an identifying mechanism such that when the particular channel identifier overlay 80 is placed on the base portion 20, the active channels are recognized. Non-limiting examples of suitable identifying mechanisms include radio frequency identification and physical structures such as extensions and depressions.

While the figures illustrate that most of the operable components of the wireless controller system 10 are included in the base portion 20, it is possible for some of the operable components to be included in the cover portion 22.

The wireless controller system 10 may be configured to turn off when the cover portion 22 is in the closed configuration. Alternatively or additionally, the wireless controller system 10 may also be configured to turn off when the cover portion 22 is in the open configuration and the wireless controller system 10 is not used for a specified period of time. In certain embodiments, the non-use period may be about 3 minutes.

The wireless controller system 10 may be configured to turn on when the cover portion 22 is moved to the open configuration. Alternatively or additionally, the wireless controller system 10 may be configured to turn on when one of the buttons 40, 42 is pressed.

When the wireless controller system 10 is turned on, a light adjacent to the first channel 82 may illuminate to indicate that the wireless controller system 10 is turned on. This configuration may be referred to as a default position that is displayed each time the wireless controller system 10 is turned on.

The wireless controller system 10 may also include a switch mechanism 90 that is operable based upon the orientation of the cover portion 22 with respect to the base portion 20. For example, the switch mechanism 90 may disable the transmitting functions of the wireless controller system 10 when the cover portion 22 and the base portion 20 are in the closed configuration. This feature would prevent inadvertent activation of the wireless controller system 10.

Alternatively or additionally, the switch mechanism 90 may turn off the wireless controller system 10 when the cover portion 22 and the base portion 20 are in the closed configuration. This feature would increase the battery life.

In certain embodiments, the switch mechanism 90 includes a magnet 86 and a reed switch 87. The magnet 86 may be mounted on the cover portion 22 and the reed switch 87 may be mounted on the base portion 20. When the cover portion 22 and the base portion 20 are in the closed configuration, the magnet 86 may be proximate the reed switch 87 such that the magnet 86 causes the reed switch 87 to be activated. A person of skill in the art will appreciate that other configurations may be used for the switch mechanism 90 that incorporates the concepts of this invention.

A lock mechanism (not shown) may be operably attached to at least one of the base portion 20 and the cover portion 22. The lock mechanism may be used to maintain the wireless controller system 10 in the closed configuration. An example of one such lock mechanism is a tab attached to the cover portion 22 that partially extends over the base portion 20 when the wireless controller system 10 is in the closed configuration.

To assist a person in operating and/or programming the wireless controller system 10, instructions for operating and/or programming the wireless controller system 10 may be provided on a surface of at least one of the base portion 20 and the cover portion 22. For example, the instructions may be printed on an inner surface of the cover portion 22 so that the instructions may be viewed when the cover portion 22 is in the open configuration.

The wireless controller system 10 may include a holding mechanism to facilitate holding the wireless controller system 10. In certain configurations, the holding mechanism may include an aperture 88 formed in at least one of the base portion 20 and the cover portion 22. A strap (not shown) may be extended through the aperture. One such configuration for the strap is a lanyard that may be extended around a person's neck.

In other configurations, a mounting bracket (not shown) may be used in conjunction with the wireless controller system 10. The mounting bracket may take a variety of configurations. In one configuration, the mounting bracket is attached to a person's belt or another portion of the person's clothing. The mounting bracket may also be attached to a portion of a vehicle on which the wireless controller system 10 may be used such as in a cab of a truck.

In certain embodiments, such as are illustrated in FIGS. 7-31, the wireless controller system 110 has a display mechanism 118 that is capable of displaying text and/or graphics, as illustrated in FIGS. 7 and 8. While not illustrated in these figures, the wireless controller system 110 may include a cover portion that is operably attached thereto.

The display mechanism 118 may include a screen identifier 124 that identifies the screen that is currently being displayed. For example, the screen identifier 124 may display HOME to indicate that the initial screen is being displayed, such as is illustrated in FIG. 9. When the wireless controller system 110 is configured for controlling the position of the tarp system, the screen identifier may display TARP.

The screen identifier 124 may be configured to enhance the ability to see the screen identifier 124. For example, the screen identifier 124 may be positioned proximate an upper portion of the display mechanism 118. The screen identifier 124 may also be displayed in a manner that increases the ability to see the screen identifier 124. For example, the screen identifier 124 may be displayed in an inverse print where the background and foreground colors are switched with respect to at least a portion of the other text and/or images on the display mechanism 118. The screen identifier 124 may also utilize different text color, size and font than the other text on the display mechanism 118.

The display mechanism 118 may include an available component list 150 that includes the names of each of the components that may be operated by the wireless controller system 110. The available component list 150 may be provided in words and/or illustrations of the shape of the component.

If the number of components that may be operated using the wireless controller system 110 is more than can fit at one time on the display mechanism 118, an up arrow or a down arrow may be displayed to indicate that more components may be viewed by scrolling upward or downward.

The available component list 150 may also include an indication of the current status of each of the components that is placed adjacent to the name of the component. For example, the current status may be identified as CLOSED, OPEN, ON or OFF.

The current status may also indicate the status of the component when in an intermediate position. For example, the use of the designation 4% may indicate that the hopper is approximately 4% open.

In this embodiment, a component operation button 120a, 120b is proximate to a component operation identifier 122a, 122b, which indicates the operational function caused by pressing the component operation button 120a, 120b, respectively. Placing the component operation identifier 122a, 122b proximate the component operation button 120a, 120b, respectively, enables the component operation identifier 122a, 122b to be viewed when a person's finger is on the component operation button 120a, 120b.

The component operation identifier 122a, 122b may be incorporated into the display mechanism 118. This configuration enables the component operation identifier 122a, 122b to be changed based upon which of the components has been selected to be operated.

In one configuration, the wireless controller system 110 may include two of the component operation buttons 120a, 120b and two of the component operation identifiers 122a, 122b. For example, one of the component operation identifiers 122a may display OPEN to indicate that the adjacent component operation button 120a is for opening a tarp. Similarly, one of the component operation identifiers 122b may display CLOSE to indicate that the adjacent component operation button 120b is for closing the tarp.

The component operation identifier 122a, 122b may be changed based upon the operational status of the component being controlled. For example, the component operation identifiers 122a, 122b may only display OPEN when the component is not in the open configuration (FIG. 10). Similarly, the component operation identifiers 122a, 122b may only display CLOSE when the component is not in the closed configuration (FIG. 12).

Accordingly, the component operation identifiers 122a, 122b may display OPEN and CLOSE when the component is in an intermediate position such that the component may be moved to the open configuration and the closed configuration (FIG. 11).

The component operation identifiers 122a, 122b may also change color to indicate that the associated component operation button 120a, 120b may be pressed. For example, the component operation identifiers 122a, 122b may be green to indicate that the associated component operation button 120a, 120b may be pressed. The color of the component operation identifiers 122a, 122b could be selected to be readily distinguished from the colors used on the other portions of the display mechanism 118. Similarly, the component operation identifiers 122a, 122b may be changed to a color such as red to indicate that the component operation button 120a, 120b is not available to be pressed.

Using the preceding configuration enhances the ability to use the wireless controller system 110. Only the available operations are displayed in this configuration on the component operation identifier 122a, 122b in a manner that facilitates easily viewing them.

In certain configurations, the component operation button 120a, 120b and the component operation identifier 122a, 122b are located proximate a lower portion of the wireless controller system 110, as illustrated in the figures. Providing the component operation button 120a, 120b and the component operation identifier 122a, 122b in this location enhances the ability for the user to not only see the component operation identifier 122a, 122b when operating the component operation button 120a, 120b but also to see the other aspects displayed on the display mechanism 118.

To minimize the potential of the component being activated for more than a desired amount of time, the component may operate only when the component operation button 120a, 120b is pressed. The operation of the component thereby automatically stops when the component operation button 120a, 120b is not pressed. This configuration also causes the component to stop operating if the communication link between the component and the wireless controller system is broken.

The wireless controller system 110 includes a mechanism for controlling which of the components is selected and thereby the operation of which component can be controlled. In one such configuration, this mechanism includes a select button 130 and at least one movement button 132a, 132b.

As an alternative to using separate select button 130 and movement buttons 132a, 132b, it is possible to utilize a touch sensitive interface. Sliding a user's finger over the touch sensitive interface may cause the list of components to scroll in a direction that is similar to the direction the finger slides over the touch sensitive interface. Once the desired component is visible on the display, the desired component may be high-lighted. Tapping on the touch sensitive interface may be used to select the desired component.

The movement button 132a, 132b enables a user to scroll through the list of available components. While it is possible to provide only one of the movement buttons 132a, 132b, such a configuration would enable scrolling through the components in a single direction such as moving downward.

In another configuration, two movement buttons 132a, 132b are provided. One of the movement buttons 132a is used to move in a first direction such as up and the other movement button 132b is used to move in a second direction such as down.

To indicate which of the components is ready to be selected, the invention may highlight or otherwise identify this component. For example, a box may be placed around the component that is ready to be selected. Alternatively, the name of the component may be presented in a different color than the names of the components that are not available to be selected.

Once the component that is desired to be operated is highlighted, the select button 130 may be pressed to cause the system to go into a submenu where the operation of this component may be controlled. The screen identifier 124 may change to indicate that the submenu has been entered.

For at least some of the components, it may be possible to operate the component from the home screen (FIG. 9) without having to use the select button 130 to enter the submenu such as is illustrated in FIG. 10. In certain embodiments, the components that may be controlled from the home screen may be those components whose operation, at other than desired times, is not likely to lead to a dangerous situation. An example of such a component is turning on and off the hopper light or the top light.

To indicate to a user that it is possible to control the operation of a particular component from the home screen, at least one component operation identifier 122a, 122b may be displayed when such a component has been selected. Such a display is in contrast to the home screen illustrated in FIG. 9 where no component operation identifier 122a, 122b is displayed.

In certain configurations, the select button 130 and the movement buttons 132a, 132b may be located proximate a lower portion of the wireless controller system 110, as illustrated in the figures. The select button 130 may be positioned intermediate the movement buttons 132a, 132b.

One the of movement buttons 132a may be positioned above the selection button 130 to indicate that this movement button 132a is used to move upwards, and one of the movement buttons 132b may be positioned below the selection button 130 to indicate that this movement button 132b is used to move downwards.

Once the desired component has been highlighted, the select button 130 may be pressed to select the component that is to be controlled. Pressing the select button 130 causes the display mechanism 118 to change to a component operational status view, which is illustrated in FIG. 10.

The component operational status view may prominently display the name of the component that has been selected to be operated by the wireless controller system 110. For example, the name TARP may be displayed at a location that is at approximately the center of the component operational status view.

The component operational status view may include an illustration 170 that at least partially depicts the shape of the component being operated with the wireless controller system 110. For example, when a tarp is being controlled, the illustration 170 may have a convex shape that is similar to the shape of an upper end of the trailer on which the tarp system would be used.

The component operational status view may also include indicia that indicates the current status or position of the component being controlled. For example, a line 174 may extend at least partially over the illustration 170 of the component being operated. When the line 174 extends substantially between both sides of the component illustration 170, this may be indicative of the tarp being in a closed configuration, as illustrated in FIG. 10. When the line 174 is not visible or only a short line 174 is visible, this may be indicative of the tarp being in an open configuration, as illustrated in FIG. 12.

To further enhance the ability to identify the location of the end of the line 174, a secondary position identifier 176 may be provided proximate the end of the line 174 that changes position based upon the location of the tarp. In one such configuration, the secondary position identifier 176 is a circle. The circle may have a diameter that is greater than a diameter of the line 174.

The component operational status view may also include a textual and/or numerical indicator 175 of the status of the component that is positioned adjacent to the illustration 170. For example, the indicator 175 may display CLOSED when the tarp is in the closed position (FIG. 10), 50% OPEN when the tarp is in an intermediate position of about 50 percent open (FIG. 11) and 100% OPEN when the tarp is in a fully open position (FIG. 12).

In contrast to the operation of the wireless controller system 110 only when the button is pressed that is described above, it is possible for the wireless controller system 110 to also include an express mode. When the express mode is activated, the component continues to operate after a button is pressed until the component reaches the end of its range of motion, such as moving from the open position to the closed position.

The express mode may enable the component to continue operating even if one of the buttons on the wireless controller system 110 is not pressed. While the component is operating in the express mode, the screen identifier 124 may include a designation such as EXPRESS MODE indicating the wireless controller system 110 is operating in the express mode such as is illustrated in FIG. 13.

The availability of operating the wireless controller system 110 in the express mode may be indicated on the display such as in the component operational status view. For example, the display mechanism 118 may display the designation EXP along with an indication of how to enter the express mode such as by pressing the down movement button 132*b*, as illustrated in FIG. 12.

To minimize the potential of inadvertent operation, it may be necessary to press at least one button in a manner that is distinct from the manner in which the button is pressed during the typical operation of the wireless controller system 110. For example, two short presses of the select button 130 may be needed to enter the express mode.

Once the wireless controller system 110 has entered the express mode, the wireless controller system 110 may be configured to easily terminate the express mode. For example, when the wireless controller system 110 is in the express mode, pressing any of the buttons on the wireless controller system 110 may terminate the express mode. The display on the wireless controller system 110 may display instructions for the operator to discontinue the express mode.

When the wireless controller system 110 is in the component operational status view, the display mechanism 118 may include instructions for returning to the available component list (FIG. 10). For example, the designation UP=HOME may be displayed to indicate that pressing the up movement button 132*a* may cause the wireless controller system 110 to return to the available component list 150.

The front hopper may be operated using the wireless controller system 110 in a similar manner. For example, the at least one movement button 132*a*, 132*b* may be utilized to highlight or otherwise select the identifier T1 FR HPPR, which signifies front hopper on trailer 1. When the select button 130 is pressed, the FRONT HPPR control screen is displayed, as illustrated in FIG. 14. When this screen is displayed, the configuration of the front hopper on trailer 1 may be changed by using the at least one component operation button 120*a*, 120*b*.

Similar to the at least one component operation button 120*a*, 120*b* associated with the tarp, the at least one component operation button 120*a*, 120*b* associated with the front hopper may only operate when pressed. Such a configuration reduces the potential of the front hopper opening too far because the operator's initial reflex to the front hopper opening more than a desired amount would be to release the at least one component operation button 120*a*, 120*b*.

The current position of the front hopper may be displayed in graphical form 170 and/or textual form 175, as illustrated in FIGS. 14 and 15. Similar to the graphical form used in conjunction with the tarp, the graphical form 170 may change to graphically indicate the extent to which the front hopper is open. When the front hopper is closed, the textual form 175 may display CLOSED as illustrated in FIG. 14. When the front hopper is at an intermediate position that is about in the middle of open and closed, the textual form 175 may display 50% OPEN, as illustrated in FIG. 15.

The wireless controller system 110 may also be used in conjunction with controlling the operation of lights on the vehicle. For example, the home screen may include the following designations T1 HPR LIGHT, which designates the hopper light on trailer 1, as illustrated in FIG. 9. Adjacent to the name of this component may be an identifier of the current status of the component such OFF or ON.

Figures 16, 17, 18:
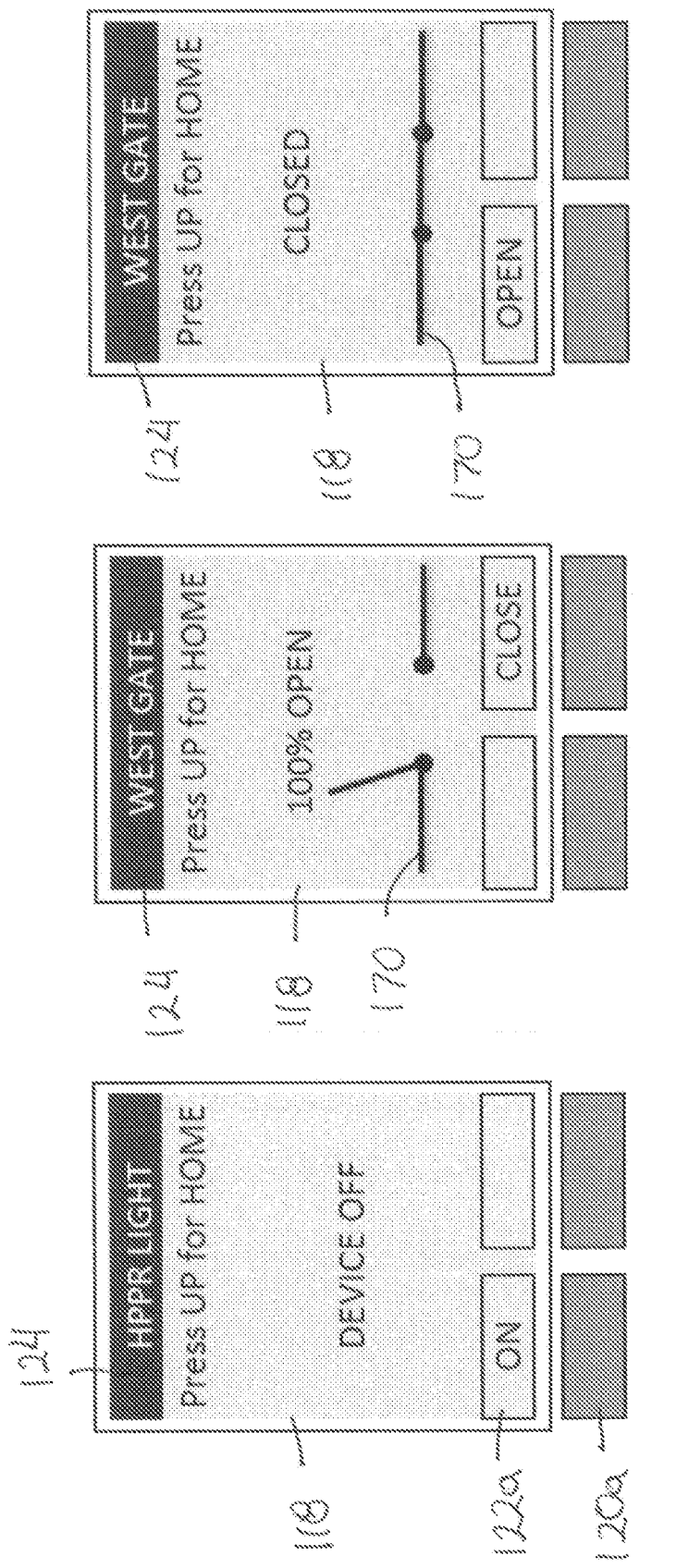
FIG. 16 is the display mechanism in a hopper light control mode where a hopper light is off.
FIG. 17 is the display mechanism in a west gate control mode where a west gate is in a 100% open position.
FIG. 18 is the display mechanism in the west gate control mode where the west gate is in a closed position.

When it is desired to control the hopper light, the movement button 132*a*, 132*b* may be used to highlight the desired component. The select button 130 may then be pressed to cause the wireless controller system 110 to enter the sub-menu such as is illustrated in FIG. 16. The screen identifier may display HPPR LIGHT to indicate that the displayed screen is used to control the operation of the hopper light.

Since it is possible to use the wireless controller system 110 in conjunction with a number of objects and such objects may include more than one of each type of object, the wireless controller system 110 may utilize designations that enable the individual components to be distinguished from each other.

For example, when more than one trailer is used in conjunction with the wireless controller system 110, each of the trailers may be assigned an identifier such as T1 to indicate trailer 1. Alternatively or additionally, the identifier may include a number that is affixed to a surface of the trailer or may correspond to a license plate that is affixed to the trailer.

Since it may be desirable for the wireless controller system 110 to have a relatively small size and it may be desirable for text used on the display mechanism to have a relatively large size to facilitate viewing such text, it may be desirable to shorten the names of the components such as HPPR or HPR being an abbreviated form of hopper.

The display mechanism 118 may include a designation of the current status of this component such as DEVICE OFF. This designation may be displayed near the center of the display mechanism 118 so that a user may readily see the current status of the component.

The component operation identifier 122a, 122b may include only one item that is indicative of the available option for controlling the operation of the component. For example, when the hopper light is off, the left component operation identifier 122a may have the word ON displayed thereon to indicate to a person using the wireless controller system 110 that pressing the left component operation button 120a would cause the hopper light to be turned on.

The right activation button 120b, which is intended to be used to turn off the hopper light, may not have any text displayed in the associated component operation identifier 122b. This configuration may enhance the ability of the person using the wireless controller system 110 to accurately control the desired components.

The wireless controller system 110 may also be used to control components that are used in conjunction with the vehicle. An example of one such component is a gate that provides access to an area where the vehicle will be stored.

For example, the at least one movement button 132a, 132b may be utilized to highlight or otherwise select the identifier WEST GATE, which signifies a particular gate that is desired to be operated. The select button 130 may then be pressed, which causes the WEST GATE control screen to be displayed, as illustrated in FIGS. 17 and 18. When this screen is displayed, the position of the gate may be changed by using the at least one component operation button 120a, 120b.

The current position of the west gate may be displayed in graphical form 170 and/or textual form 175. Similar to the graphical form used in conjunction with the tarp, the graphical form 170 may change to graphically indicate that the gate is open (FIG. 17) or closed (FIG. 18). When the west gate is open, the textual form 175 may display 100% OPEN, as illustrated in FIG. 17. When the west gate is closed, the textual form 175 may display CLOSED, as illustrated in FIG. 18.

In other configurations where there is only a single activation button, the text, graphic or display associated with the activation button may change depending on the current state of the component being controlled. For example, the single activation button may be green when the component is turned off and may be red when the component is turned on.

To increase the safety of the wireless controller system 110 and the associated components that are controlled using the wireless controller system 110, the wireless controller system 110 may include a warning mode that alerts the operator of potentially unsafe conditions when the vehicle is being moved.

One such potentially unsafe condition is the tarp being positioned at an intermediate location between the open and closed positions when the vehicle is moving. Other potentially unsafe conditions include trap doors not being fully closed, landing gear not being fully retracted, work lights being on, trailer power not being connected and trailer power not being within operating specifications.

To further increase the functionality of the wireless controller system 10, the wireless controller system 110 may include audio and/or video feedback regarding the status of the component being operated. For example, a video camera (not shown) may be mounted on the trailer to view the product being discharged from the hopper(s). The operator could thereby view the discharging process such as to determine if there is a problem with the receptacle into which the product is being discharged, or to see when all of the product has been discharged from the vehicle.

Alternatively or additionally, a video camera (not shown) may be mounted in the vehicle where the product is stored to allow the operator to continually see the level of product that remains in the vehicle. When combined with the video camera viewing the discharging process, it would be possible for the operator to determine if there is a problem such as with the hopper doors that prevents the product from being discharged from the vehicle.

The wireless controller system 110 may be configured to automatically turn on the video camera(s) that are associated with the components that are being controlled. For example, selecting the front hopper may cause the video camera positioned adjacent to the front hopper to be turned on.

The video and/or audio may be displayed on or emitted from the wireless controller system 110. If a video camera is used, the display portion may be reconfigured so that the video feed is displayed along with the appropriate controls to operate the component that is being controlled.

The wireless controller system 110 may also include a video camera (not shown) that is attached to a rear end of the vehicle. Such a video camera would provide the operator with the ability to view objects that are located behind the vehicle that would typically not be viewable by the operator.

The rear video camera could be turned on and displayed using a variety of techniques. One such technique is that the operator manually turns on the rear video camera by manipulating the controls on the wireless controller system 110. In other embodiments, the rear video camera may be turned on when the transmission on the vehicle on which the wireless controller system 110 is used is put into reverse gear.

In still other embodiments, the rear video camera may be turned on when a motion sensing component associated with the wireless controller system 110 senses that the vehicle is moving in a backward direction. An example of one such motion sensing component is a GPS system.

The wireless controller system 110 may further include on the display mechanism 118, the current time and date. This information may be used for the operator to track or record the day and time of a particular delivery.

The wireless controller system 110 may further include a timer (not shown) that may be used to track various aspects associated with the use of the wireless controller system 110. For example, the timer may be used to record the time needed for the product to unload from the vehicle.

The timer may be manually operable by the operator such that the operator presses a button on the wireless controller system 110 when it is desired to stop and start the timer. Such a configuration would be similar to the manner in which a stop watch operates.

The timer may also be integrated with the other aspects of the wireless controller system 110 so that the timer is automatically activated, such as when the hopper door begins to open. A sensor may be provided proximate the hopper door to monitor when the product ceases to flow through the hopper door as an indicator that all of the product has been emptied from the vehicle. This sensor would thereafter cause the timer to stop. A person of skill in the art will appreciate that the sensor may take a variety of forms such as an optical system or a mechanically deflectable system.

The wireless controller system 110 may track the time for certain activities to occur such as the amount of time for all of the product to be removed from the vehicle. If the wireless controller system 110 senses that an activity is taking longer than the activity typically takes, the wireless controller system 110 may issue a warning to the operator.

Such a warning would thereby cause the operator to investigate whether there is a problem. This type of system could enable the magnitude of the problem or the duration of the problem to be decreased.

The wireless controller system 110 may further include an illumination device (not shown) associated therewith. In certain embodiments, the illumination device may include a light source that enables light to be directed away from the wireless controller system 110 such that the illumination device may be used to view portions of the vehicle in conjunction with which the wireless controller system 110 is used, that are not possible to view using ambient light or when the vehicle is intended to be used in conditions where ambient light is not available.

A person of skill in the art will appreciate that the illumination device may take a variety of forms using the concepts of the invention. An example of one such suitable form for the illumination device is an LED.

While it is possible to include a separate power indicator on the wireless controller system 110 to indicate that the wireless controller system 110 is turned on, it is typically desired to maximize the battery life of the wireless controller system 110 and, as such, the separate power indicator would consume additional battery power, which could reduce the operation life of the battery. The power indicator could be incorporated into a trademark of the company that manufactures and/or markets the wireless controller system 110 or the component being controlled.

Figure 19:
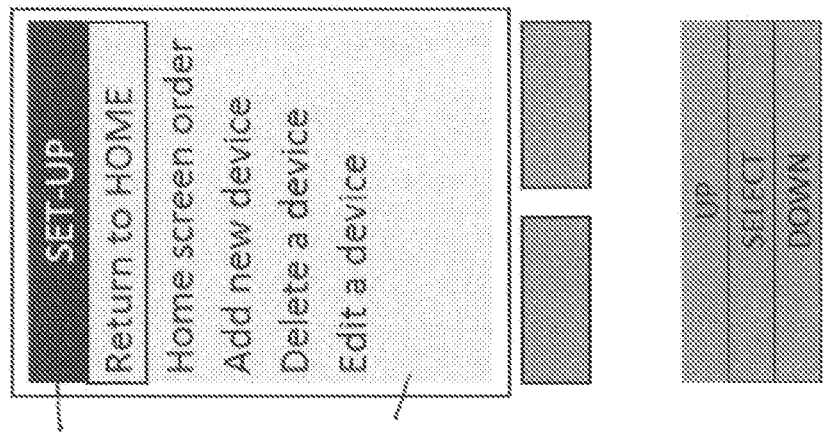
FIG. 19 is the display mechanism in a set-up mode.

As set forth above, the wireless controller system 110 may include the ability to selectively activate or deactivate the ability to control particular features or components by entering a setup mode, which is illustrated in FIG. 19. To prevent the components from being inadvertently turned on or off, the transmission mechanism may be turned off when the wireless controller system 110 is in the setup mode.

One possible mechanism for entering the setup mode is to utilize a button that is included on the home screen, which is illustrated in FIG. 19. To reduce the potential of the setup mode being entered inadvertently, it may be necessary to enter a password prior to entering the setup mode.

Alternatively, the setup mode may be entered by pressing a button (not shown) included on a surface of the wireless controller system 110. The setup mode button may also be formed with a shape that restricts the ability of a person using the wireless controller system 110 to press the setup mode button. For example, the setup mode button may be formed with a size that is sufficiently small so that it cannot be pressed using a person's finger. Rather, the setup mode button may be pressed using a small object such as a pin.

Alternatively, a combination of buttons may need to be pressed on the wireless controller system 110 to enter the setup mode. This combination of buttons may be pressed simultaneously or consecutively. This combination of buttons should be sufficiently different than the combinations of buttons that are pressed during the operation of the wireless controller system 110 such that a person using the wireless controller system 110 would not inadvertently enter the setup mode. Alternatively, a single button may be depressed for an extended period of time to enter the setup mode.

Once in the setup mode, a setup mode display may be displayed on the wireless controller system 110 such as is illustrated in FIG. 19. In one embodiment, the setup mode may include the ability to add or remove components that may be controlled by the wireless controller system 110. The setup mode may also include the ability to change settings relating to the components that may be controlled by the wireless controller system 110.

The setup mode may also include the ability to change other aspects of the wireless controller system 110. An example of one such additional aspect of the wireless controller system 110 is the order in which the components are listed on the display. Other aspects of the wireless controller system 110 that could be configurable include the colors of the display.

Additionally, the setup mode may allow certain functions of the wireless controller system 110 to be limited or restricted. In certain embodiments, it may be desirable to limit the functionality of the wireless controller system 110 when the wireless controller system 110 is intended to be operated by novice users. An example could include restricting the use of Express functions. Selecting a single line item in the setup mode may place the wireless controller system 110 in the Novice mode, saving time compared to configuring each controlled device separately.

When the wireless controller system 110 is in the setup mode, the operational features of the wireless controller system 110 may be changed. For example, the setup mode may be used to activate or deactivate controls for particular accessories that are desired to be controlled by the wireless controller system 110. By deactivating the controls for the accessories that are not in use, the wireless controller system 110 may be operated more quickly because the operator will not have to scroll through channels that are not active.

When in an initial setup mode, which is illustrated in FIG. 19, the display mechanism may provide a relatively short list of options that may be modified. A non-limiting list of the modifiable options includes changing an order of the controllable devices on the home screen, adding a new device, deleting a device and changing a configuration of one of the devices that was previously associated with the wireless controller system 110.

Figure 20:
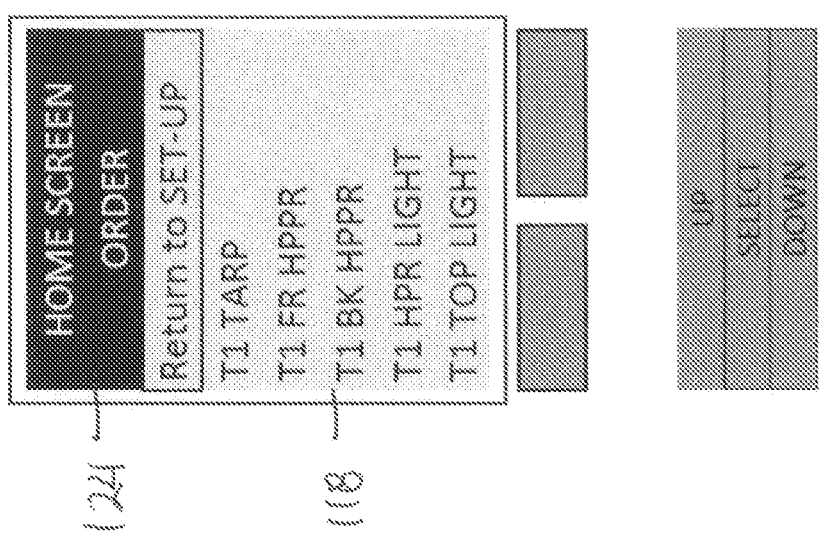
FIG. 20 is the display mechanism in a home screen order control mode.

When it is desired to change the order of the controllable devices, the movement buttons 132a, 132b are used to high-light "home screen order." Pressing the selection button 130 causes the wireless controller system 110 to enter the home screen order modification screen, which is illustrated in FIG. 20.

Figure 21:
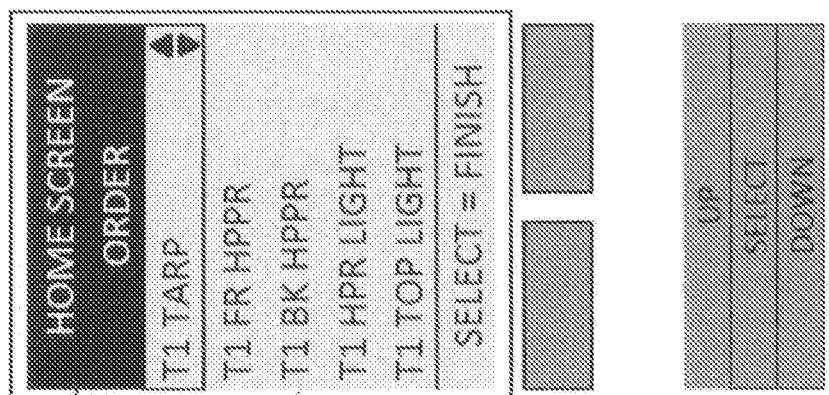
FIG. 21 is the display mechanism in the home screen order control mode where a T1 TARP identifier is selected for movement to a different position.

The home screen order modification screen includes a list of all of the components that are controllable using the wireless controller system 110. The movement buttons 132a, 132b are used to high-light the device that it is desired to be moved. Pressing the selection button 130 causes the wireless controller system 110 to enter the device movement mode, which is illustrated in FIG. 21.

An indicator such as two arrows may be positioned adjacent to the name of the component that has been selected for movement. The movement buttons 132a, 132b are used to move the device name to the desired location. Once the device name is at the desired location, the selection button 130 is pressed to cause the device name to be retained at the new location.

Figure 22:
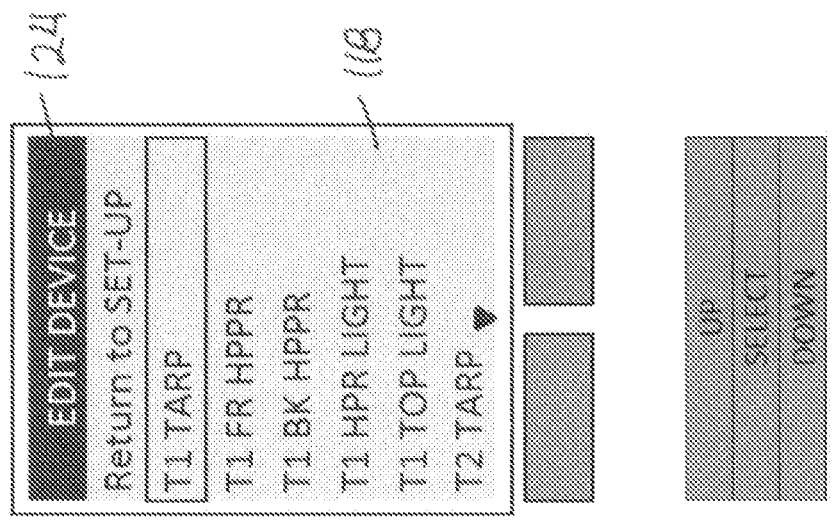
FIG. 22 is the display mechanism in an edit device mode.
Figure 27:
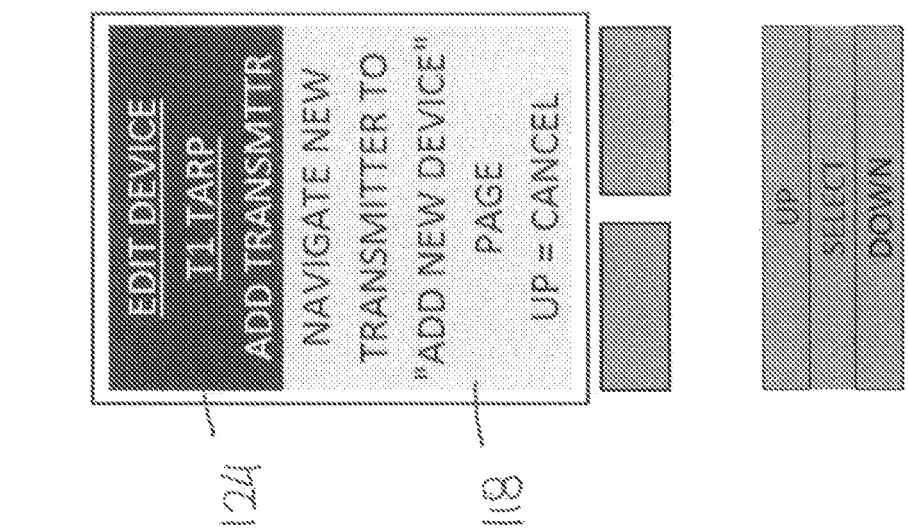
FIG. 27 is the display mechanism in an add transmitter mode.

When it is desired to change the configuration of one of the controllable devices, the movement buttons 132a, 132b are used to high-light "edit a device." Pressing the selection button 130 causes the wireless controller system 110 to enter the device modification screen, which is illustrated in FIG. 22.

Figure 23:
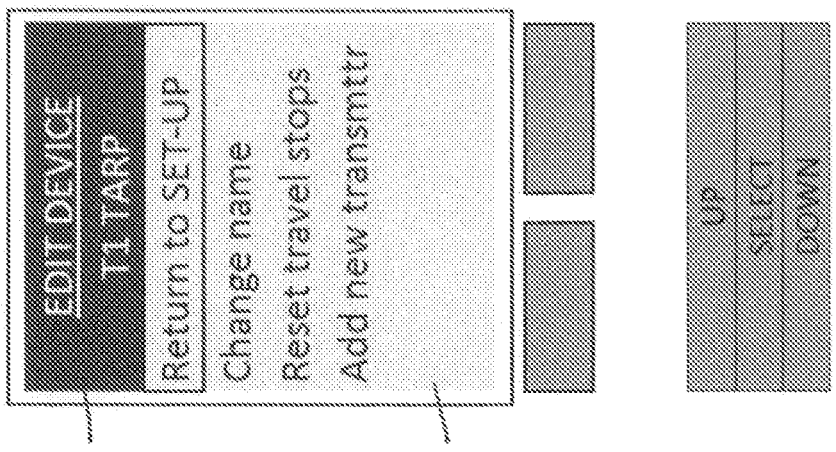
FIG. 23 is the display mechanism in the edit device mode where T1 TARP has been selected for editing.

The device modification screen includes a list of all of the components that are controllable using the wireless controller system 110. The movement buttons 132a, 132b are used to high-light the device that it is desired to be edited. Pressing the selection button 130 causes the wireless controller system 110 to enter the device edit mode for the selected device, which is illustrated in FIG. 23.

Examples of the aspects that may be changed in the device modification screen include changing the name of the device, resetting travel stops associated with the device and adding a new transmitter. Each of these items may be set forth on the device modification screen.

The process associated with setting the travel stops is illustrated in FIGS. 24 and 25. This process includes moving the device to an open position and pressing a particular button on the wireless controller system 110 to confirm that the device is in the open position. Thereafter, the device is moved to a closed position and a particular button on the wireless controller system 110 is pressed to confirm that the device is in the closed position. These travel stops may remain stored in the memory of the wireless controller system 110 until the associated device is deleted or the travel stop setting process is repeated.

Setting the travel stops is desirable because it enables the wireless controller system 110 to discontinue sending signals to the device when the device has reached the opened or closed position. The travel stops thereby minimize stresses on the equipment such as continue to operate a motor when the associated device has reached an end to its range of motion. Because of the importance of setting the travel stops, a warning such as "travel stops not set" may be displayed on the device operation screen to alert the operator such as is illustrated in FIG. 26.

Figure 28:
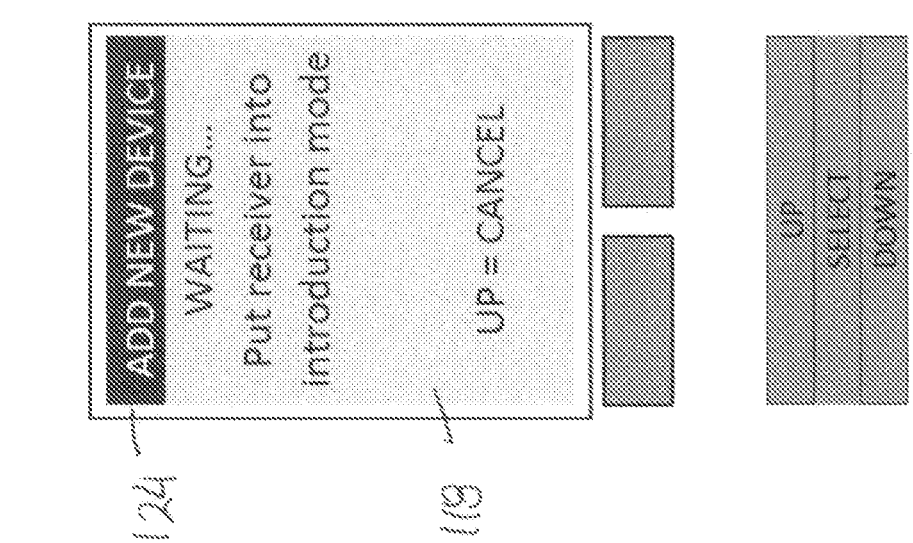
FIG. 28 is the display mechanism in a new device introduction mode.

When it is desired to associate a new device to be controlled by an existing transmitter to the wireless controller system 110, a multiple step process is followed such as is illustrated in FIGS. 27-31. The wireless controller system 110 is put into waiting mode, which is illustrated in FIG. 28, in which the wireless controller system 110 searches for transmitters that are in introduction mode.

Figure 29:
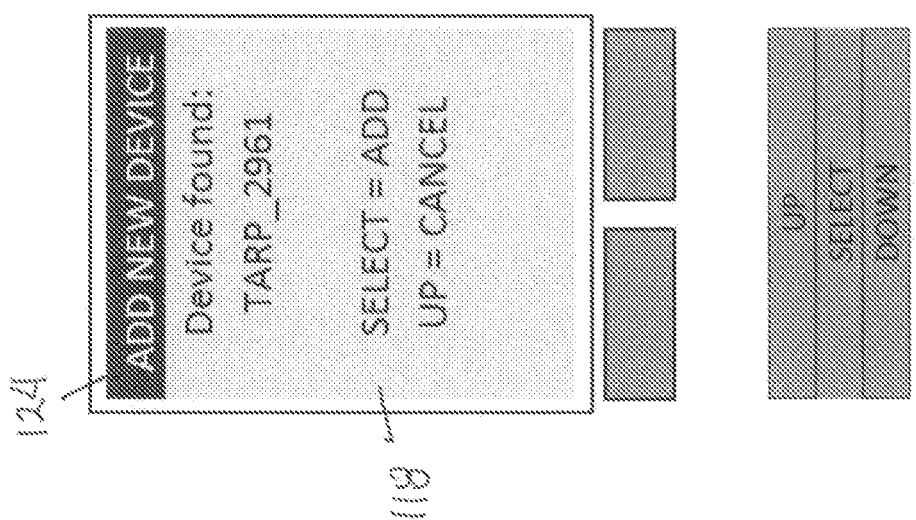
FIG. 29 is the display mechanism in a new device found mode.

Once a transmitter and a receiver have been introduced, the display mechanism 118 displays the details of the new device so that the user can confirm that the correct device has been identified, such as illustrated in FIG. 29.

Figure 31:
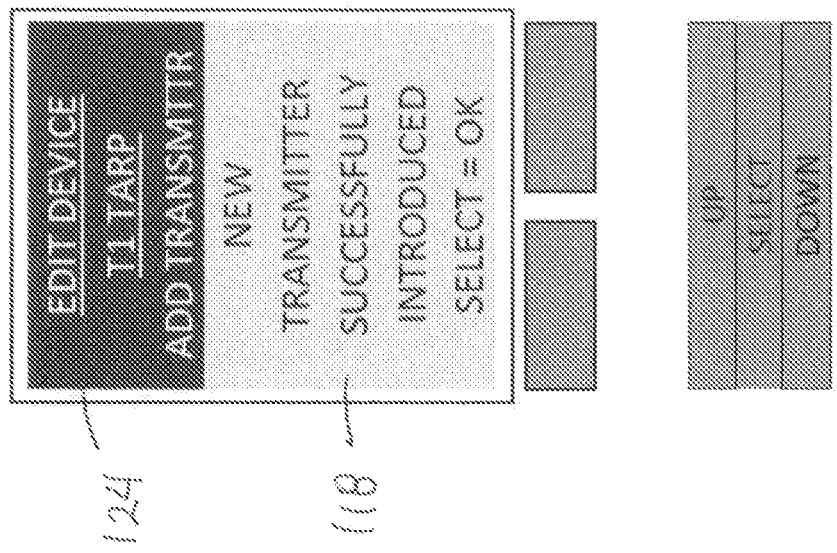
FIG. 31 is the display mechanism in a new transmitter successfully introduced mode.
Figure 30:
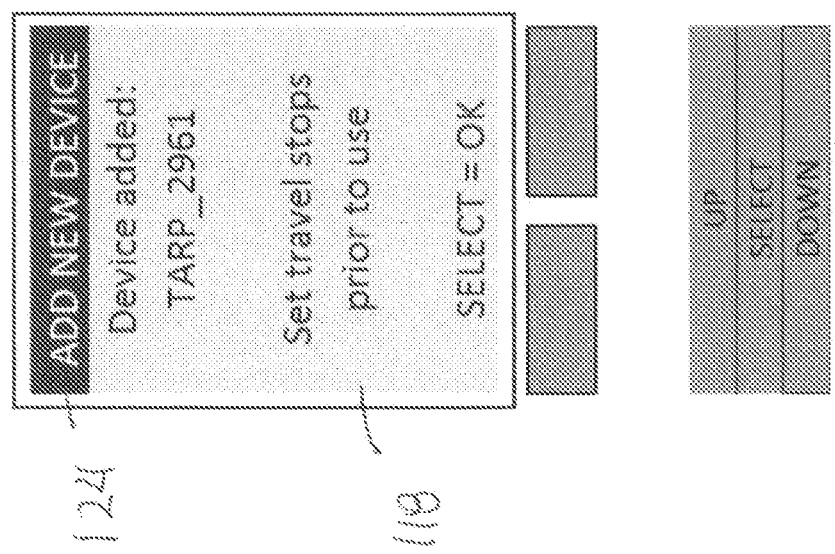
FIG. 30 is the display mechanism in a new device added mode.

Thereafter, the display mechanism 118 displays confirmation that the new device has been successfully added such as is illustrated in FIGS. 30 and 31. If appropriate, a warning may be displayed about setting travel stops associated with the new device.

If it is desired to cancel the changes being made while the wireless controller system 110 is in the programming mode, the programming mode may be canceled by moving the cover portion 22 to the closed configuration or otherwise turning off the wireless controller system 110.

As an alternative to programming the wireless controller system 110 on the display, it is possible to use other techniques for programming the wireless controller system 110. For example a cable could be used to connect the wireless controller system 110 to a computer that would be used to configure the wireless controller system 110. Since the wireless controller system 110 includes the ability to wirelessly transmit and receive, the configuration of the wireless controller system 110 may be done using a wireless link to a computer.

In certain embodiments, the receiver on the component may include a learn button. The learn button may be activated such as by pressing the learn button for more than a selected period of time. While the receiver is in the learn mode, the select button is pressed until the channel that is desired to be programmed is illuminated or otherwise highlighted.

Another technique to enhance the ease at which the wireless controller system 110 may be used is to have the wireless controller system 110 search for controllable components each time the wireless controller system 110 is turned on.

Alternatively or additionally, the wireless controller system 110 may be configured to periodically search for controllable components. For example, the wireless controller system 110 may search for controllable components every 10 minutes.

The controllable device list, which is set forth in FIG. 9, may only list the controllable components that were identified during the polling process. The components that were previously associated with the wireless controller system 110 but which are not sufficiently close to be controlled may be removed from the controllable device list.

Alternatively, the components that are not currently controllable may be listed in a manner that indicates they are not controllable such as with a different color or strike through. By listing these non-controllable components, the user would know that these components are configured for with the wireless controller system 110 but are not currently available for use.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized, and structural or logical changes may be made, without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A method of using a wireless controller system for operably controlling at least two electrically operable accessories that are associated with a vehicle, one of the electrically operated components comprising a tarp system for selectively covering a hopper associated with the vehicle, the tarp system being movable between an open configuration substantially covering the hopper and a closed configuration uncovering the hopper, wherein the method comprises:

providing a wireless controller system comprising a display mechanism, a component selection mechanism, a component operation mechanism, a component operation identifier associated with but separate of the component operation mechanism, and a communication mechanism;

displaying on the display mechanism a list of the at least two electrically operable accessories and, for each listed electrically-operable accessory, an operational status of the at least two electrically operable accessories, the tarp system being listed as one of the electrically operated accessories;

receiving a selection of, via the component selection mechanism, one of the at least two electrically operable accessories for control by the wireless controller system;

displaying, on the component operation identifier, an available operational function producible by actuation of the component operation mechanism associated with the component operation identifier, wherein the component operation identifier displayed is dependent upon the selected electrically operable accessory such that the component operation identifier is changeable upon selection of a different one of the at least two operable accessories, the available operational functions for the tarp system including opening the tarp system and closing the tarp system;

receiving an actuation of the component operation mechanism to initiate the available operational function, wherein, when the selected electrically operable accessory is the tarp system, actuation of the component operation mechanism either initiates movement of the tarp toward the open configuration or the closed configuration; and sending a first communication signal to the selected electrically operable accessory using the communication mechanism.

2. The method of claim 1, wherein the component operation identifier is proximate the component operation mechanism.

3. The method of claim 1, and further comprising polling to determine what electrically operable accessories are available to be controlled with the wireless controller system.

4. The method of claim 3, wherein polling comprises:
sending a second communication signal using the communication mechanism; and
sending a third communication signal from the electrically operable accessory to the communication mechanism in response to receiving the second communication signal by the electrically operable accessory.

5. The method of claim 1, wherein the component operation identifier is displayed on a display screen, and the component operation mechanism comprises a mechanically depressible button located proximate to, but separate from, the identifier on the display screen.

6. The method of claim 1, and further comprising
operating the wireless controller system in an express mode in which the first communication signal is sent to initiate the express mode; and
terminating the express mode by pressing at least one of the component selection mechanism and the component operation mechanism.

7. The method of claim 1, and further comprising sending a second communication signal from the selected electrically operable accessory that is indicative of an operational status of the selected electrically operable accessory, wherein the operational status is displayed on the display mechanism in at least one of a graphical, numerical and textual form.

8. The method of claim 7, wherein the electrically operable accessory is the tarp system and the graphical operational status includes a line of varying length that is indicative of the current position of a tarp of the tarp system between the open condition and the closed condition.

9. The method of claim 8, and further comprising displaying a secondary position indicator that is positioned proximate an end of the line that varies in length.

10. The method of claim 1, and further comprising receiving an actuation indicating a selection of an operational mode, the operational mode being selected from a group of operational modes including the express mode of operation and an other mode of operation, the express mode of operation being characterized by continuing operation of the selected electrically operated accessory after actuation of the component operation mechanism has been discontinued, the other mode being characterized by discontinuing operation of the selected electrically operated accessory after actuation of the component operation mechanism has been discontinued.

11. The method of claim 10, wherein, upon receiving selection of the tarp system using the component selection mechanism and selection of the express mode of operation for the tarp system:
changing the component operation identifier associated with each component operation mechanism;
initiating movement of the tarp of the tarp system by sending the first communication signal to the tarp system using the communication mechanism and continuing movement of the tarp of the tarp system until:
a) an actuation of at least one component operation mechanism is received; or
b) an end of the range of motion of the tarp is reached.

12. The method of claim 11, wherein, upon receiving selection of the tarp system using the component selection mechanism and selection of the other mode of operation for the tarp system, initiating movement of a tarp of the tarp system by sending the first communication signal to the tarp system using the communication mechanism and discontinuing movement of the tarp of the tarp system when actuation of the component operation mechanism is discontinued.

13. A method of using a wireless controller system for operably controlling at least two electrically operable accessories that are associated with a vehicle, wherein the method comprises:
providing a wireless controller system comprising a display mechanism, a component selection mechanism, a pair of component operation mechanisms, a component operation identifier associated with each of the component operation mechanisms, and a communication mechanism;
displaying on the display mechanism a list of the at least two electrically operable accessories;
receiving a selection of, via the component selection mechanism, one of the at least two electrically operable accessories;
receiving an actuation indicating a selection of an operational mode, the operational mode being selected from a group of operational modes including an express mode of operation and an other mode of operation, the express mode of operation being characterized by continuing operation of the selected electrically operated accessory after actuation of the component operation mechanism has been discontinued, the other mode being characterized by discontinuing operation of the selected electrically operated accessory when actuation of the component operation mechanism has been discontinued;

receiving an actuation of one of the mechanisms to initiate an express mode of operation of the selected one of the electrically operable accessory;

changing the component operation identifier associated with each of the component operation mechanisms;

sending a first communication signal to the selected electrically operable accessory using the communication mechanism; and terminating the express mode of operation of the selected electrically operable accessory upon receiving an actuation of either one of the component operation mechanisms.

14. The method of claim 13, and further comprising sending a second communication signal from the selected electrically operable accessory that is indicative of an operational status of the selected electrically operable accessory, wherein the operational status is displayed on the display mechanism in at least one of a graphical, numerical and textual form.

15. The method of claim 14, wherein the graphical operational status includes a line of varying length that is indicative of the current position of the selected electrically operable accessory.

16. The method of claim 13, wherein receiving an actuation of the component selection mechanism terminates the express mode of operation of the selected electrically operable accessory.

17. The method of claim 13, and further comprising polling to determine what electrically operable accessories are available to be controlled with the wireless controller system.

18. The method of claim 13, wherein one of the electrically operated components comprises a tarp system for selectively covering a hopper associated with the vehicle, the tarp system being movable between a closed configuration substantially covering the hopper and an open configuration uncovering the hopper.

19. A method of using a wireless controller system for operably controlling at least two electrically operable accessories that are associated with a vehicle, one of the electrically operated components comprising a tarp system for selectively covering a hopper associated with the vehicle, the tarp system being movable between a closed configuration substantially covering the hopper and an open configuration uncovering the hopper, wherein the method comprises:

providing a wireless controller system comprising a display mechanism, a component selection mechanism, a pair of component operation mechanisms, a component operation identifier associated with each of the component operation mechanisms, and a communication mechanism;

displaying on the display mechanism a list of the at least two electrically operable accessories and, for each listed electrically-operable accessory, an operational status of the at least two electrically operable accessories, the tarp system being listed as one of the electrically operated accessories and the operational status including the open configuration or the closed configuration of the tarp system;

receiving a selection of, via the component selection mechanism, one of the at least two electrically operable accessories;

receiving an actuation indicating a selection of an operational mode, the operational mode being selected from a group of operational modes including an express mode of operation and an other mode of operation, the express mode of operation being characterized by continuing operation of the selected electrically operated accessory after actuation of the component operation mechanism has been discontinued, the other mode being characterized by discontinuing operation of the selected electrically operated accessory when actuation of the component operation mechanism has been discontinued;

changing the component operation identifier associated with each of the component operation mechanisms;

wherein, upon receiving selection of the tarp system using the component selection mechanism and selection of the other mode of operation for the tarp system, initiating movement of a tarp of the tarp system by sending a first communication signal to the tarp system using the communication mechanism and discontinuing movement of the tarp of the tarp system when actuation of the component operation mechanism is discontinued; and wherein, upon receiving selection of the tarp system using the component selection mechanism and selection of the express mode of operation for the tarp system, initiating movement of the tarp of the tarp system by sending a first communication signal to the tarp system using the communication mechanism and continuing movement of the tarp of the tarp system until:

a) an actuation of at least one of the component selection mechanism and the component operation mechanisms is received; or b) an end of the range of motion of the tarp is reached.

* * * * *